US011847909B2

(12) United States Patent
Arai et al.

(10) Patent No.: US 11,847,909 B2
(45) Date of Patent: Dec. 19, 2023

(54) INFORMATION PROCESSING METHOD AND INFORMATION PROCESSING SYSTEM

(71) Applicant: Panasonic Intellectual Property Corporation of America, Torrance, CA (US)

(72) Inventors: Toshiya Arai, Osaka (JP); Takahiro Yoneda, Osaka (JP); Yuta Shimotsuma, Osaka (JP)

(73) Assignee: PANASONIC INTELLECTUAL PROPERTY CORPORATION OF AMERICA, Torrance, CA (US)

(*) Notice: Subject to any disclaimer, the term of this patent is extended or adjusted under 35 U.S.C. 154(b) by 690 days.

(21) Appl. No.: 16/918,363

(22) Filed: Jul. 1, 2020

(65) Prior Publication Data

US 2020/0365018 A1 Nov. 19, 2020

Related U.S. Application Data

(63) Continuation of application No. PCT/JP2019/027125, filed on Jul. 9, 2019.

(30) Foreign Application Priority Data

Oct. 5, 2018 (JP) .................................. 2018-189806
May 27, 2019 (JP) .................................. 2019-098762

(51) Int. Cl.
*G08G 1/056* (2006.01)
*H04N 7/18* (2006.01)
(Continued)

(52) U.S. Cl.
CPC ............. *G08G 1/056* (2013.01); *G05D 1/021* (2013.01); *G06N 3/08* (2013.01); *G06Q 10/105* (2013.01);
(Continued)

(58) Field of Classification Search
CPC ............ G08G 1/056; G08G 1/13; G08G 1/09; G05D 1/021; G05D 1/0027;
(Continued)

(56) References Cited

U.S. PATENT DOCUMENTS 9,015,093 B1 * 4/2015 Commons .......... G01C 21/3602
706/26
9,632,502 B1 4/2017 Levinson et al.
(Continued)

FOREIGN PATENT DOCUMENTS

CN 102724482 10/2012
JP 9-128698 5/1997
(Continued)

OTHER PUBLICATIONS

Office Action with Search Report dated Jun. 28, 2022 in corresponding Chinese Patent Application No. 201980005907.8, with English translation of Search Report.
(Continued)

*Primary Examiner* — Mohamed Barakat
*Assistant Examiner* — Rufus C Point
(74) *Attorney, Agent, or Firm* — Wenderoth, Lind & Ponack, L.L.P.

(57) ABSTRACT

An information processing method, performed by a computer, includes: obtaining second situational information related to a situation of at least one of a vehicle or surroundings of the vehicle at a second time point subsequent to a first time point; determining recommended content related to vehicle monitoring recommended to a second monitoring agent by inputting the second situational information to a trained model obtained by machine learning in which first situational information and a first monitoring result which is a result of monitoring by a first monitoring agent based on the first situational information are used, the first situational
(Continued)

information being related to a situation of at least one of the vehicle or the surroundings of the vehicle at the first time point; generating presentation information for vehicle monitoring based on the recommended content determined; and causing a presentation device to output the presentation information.

16 Claims, 14 Drawing Sheets

(51) Int. Cl.
| | | |
|---|---|---|
| *G06Q 10/105* | (2023.01) | |
| *G05D 1/02* | (2020.01) | |
| *G07C 5/08* | (2006.01) | |
| *G07C 5/00* | (2006.01) | |
| *G06N 3/08* | (2023.01) | |

(52) U.S. Cl.
CPC ............ *G07C 5/008* (2013.01); *G07C 5/0841* (2013.01); *H04N 7/183* (2013.01)

(58) Field of Classification Search
CPC ......... G05D 2201/0213; G05D 1/0038; G06N 3/08; G06Q 10/105; G07C 5/008; G07C 5/0841; G07C 5/0825; H04N 7/183; H04N 7/181; H04Q 9/00; H04M 11/00
See application file for complete search history.

(56) References Cited

U.S. PATENT DOCUMENTS

| | | | |
|---|---|---|---|
| 10,175,054 B2 * | 1/2019 | Woodard | G06Q 10/047 |
| 11,388,553 B2 * | 7/2022 | Arai | H04W 4/44 |
| 2018/0101923 A1 * | 4/2018 | Griesmann | H04W 64/00 |
| 2019/0279345 A1 * | 9/2019 | Kim | G06T 5/20 |
| 2019/0291728 A1 * | 9/2019 | Shalev-Shwartz | B60W 50/12 |
| 2020/0023846 A1 * | 1/2020 | Husain | H04W 4/44 |
| 2021/0067946 A1 * | 3/2021 | Herbert | H04W 4/029 |

FOREIGN PATENT DOCUMENTS

| | | | |
|---|---|---|---|
| JP | 2005078231 A | * | 3/2005 |
| JP | 2017-147626 | | 8/2017 |
| WO | 2018/102477 | | 6/2018 |

OTHER PUBLICATIONS

Extended European Search Report dated Sep. 3, 2021 in corresponding European Patent Application No. 19868985.3.
International Search Report (ISR) dated Sep. 24, 2019 in International (PCT) Application No. PCT/JP2019/027125.
Office Action with Search Report dated Dec. 29, 2022 in corresponding Chinese Patent Application No. 201980005907.8, with English language translation of the Search Report.

* cited by examiner

INFORMATION PROCESSING METHOD AND INFORMATION PROCESSING SYSTEM

CROSS REFERENCE TO RELATED APPLICATIONS

This application is a U.S. continuation application of PCT International Patent Application Number PCT/JP2019/027125 filed on Jul. 9, 2019, claiming the benefit of priority of Japanese Patent Application Number 2018-189806 filed on Oct. 5, 2018 and Japanese Patent Application Number 2019-098762 filed on May 27, 2019, the entire contents of which are hereby incorporated by reference.

BACKGROUND

1. Technical Field

The present disclosure relates to an information processing method and an information processing system.

2. Description of the Related Art

A remote operation system is available in which a vehicle where no driver exists or a vehicle that is capable of autonomously running without being operated by a driver is indirectly operated by an operator at a remote location by wireless communication, such as wireless communication via a wireless local area network (LAN) or a mobile phone line.

In such a remote operation system, surroundings of a vehicle are observed using various sensors installed on the vehicle, such as a millimeter-wave radar, a laser radar, or a camera, and a resultant sensing data is transmitted via a communication means from the vehicle (hereinafter, referred to as the vehicle under control) to the operator. Based on the transmitted resultant sensing data, the operator perceives the state of the vehicle under control and the state of the surroundings of the vehicle under control, determines how to control the vehicle under control, and considers a method of controlling the vehicle. Subsequently, a control signal for controlling running of the vehicle is transmitted from the operator to the vehicle under control, so that the operator controls the vehicle under control from a remote location.

For example, Japanese Unexamined Patent Application Publication No. 2017-147626 discloses a technique for determining a remote operation device which remotely operates a vehicle under control for remote operation when the vehicle under control enters a specific area.

SUMMARY

In the conventional technique as disclosed in Japanese Unexamined Patent Application Publication No. 2017-147626, prior to the operation of the vehicle under control of the operator, the vehicle under control is monitored by the operator or a monitoring agent who is different from the operator and does not perform an operation (hereinafter, also collectively referred to as monitoring agent). Hereinafter, a vehicle which is monitored is referred to as a monitored vehicle. Since a monitoring agent does not know when and where a dangerous situation, such as an accident, might occur, the monitoring agent is required to monitor all the scenes as much as possible, leading to a heavy burden of monitoring. Hence, it is desirable to reduce the burden of monitoring imposed on the monitoring agent. Although Japanese Unexamined Patent Application Publication No. 2017-147626 discloses an invention which reduces the burden imposed on the operator who remotely operates the vehicle, Japanese Unexamined Patent Application Publication No. 2017-147626 does not disclose a method for reducing the burden of monitoring imposed on the monitoring agent who remotely monitors the vehicle.

In view of the above, the present disclosure provides an information processing method capable of reducing the burden of monitoring imposed on the monitoring agent.

An information processing method according to one aspect of the present disclosure includes the following performed using a computer: obtaining second situational information related to a situation of at least one of a vehicle or surroundings of the vehicle at a second time point subsequent to a first time point; determining recommended content by inputting the second situational information to a trained model obtained by machine learning in which first situational information and a first monitoring result are used, the recommended content being related to vehicle monitoring recommended to a second monitoring agent, the first situational information being related to a situation of at least one of the vehicle or the surroundings of the vehicle at the first time point, the first monitoring result being a result of monitoring by a first monitoring agent based on the first situational information; generating presentation information for the vehicle monitoring based on the recommended content determined; and causing a presentation device to output the presentation information.

General and specific aspects disclosed above may be implemented using a system, an integrated circuit, a computer program, or a computer-readable recording medium, such as a CD-ROM, or any combination of systems, integrated circuits, computer programs, or computer-readable recording media.

The information processing method according to the present disclosure is capable of reducing the burden of monitoring imposed on the monitoring agent.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

DETAILED DESCRIPTION OF THE EMBODIMENT

Figure 1:
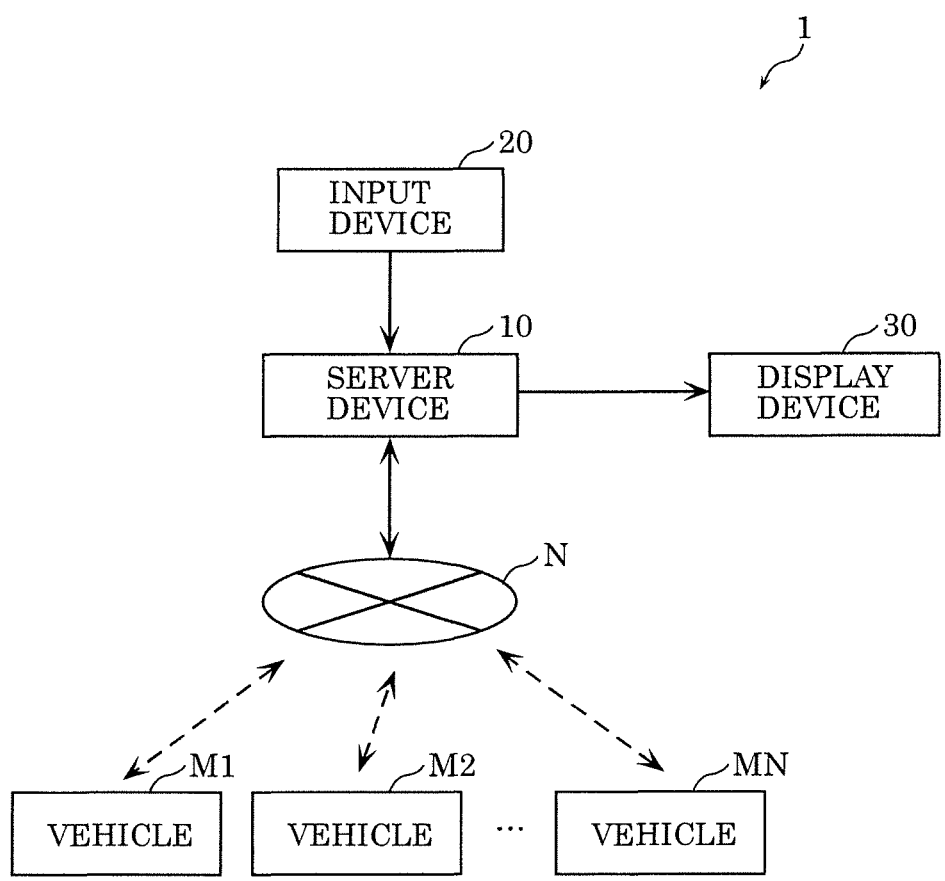
FIG. 1 is a block diagram illustrating a configuration of a monitoring system according to an embodiment.

An information processing method according to one aspect of the present disclosure includes the following performed using a computer: obtaining second situational information related to a situation of at least one of a vehicle or surroundings of the vehicle at a second time point subsequent to a first time point; determining recommended content by inputting the second situational information to a trained model obtained by machine learning in which first situational information and a first monitoring result are used, the recommended content being related to vehicle monitoring recommended to a second monitoring agent, the first situational information being related to a situation of at least one of the vehicle or the surroundings of the vehicle at the first time point, the first monitoring result being a result of monitoring by a first monitoring agent based on the first situational information; generating presentation information for the vehicle monitoring based on the recommended content determined; and causing a presentation device to output the presentation information.

According to the above aspect, by using the trained model constructed by machine learning in which the result of the determination made by the monitoring agent related to the monitoring in the situation at the first time point is used, information related to the monitoring recommended in the situation at the second time point is output. In other words, the monitoring determination made by the monitoring agent in the past is reflected in the subsequently output information related to the recommended monitoring. Accordingly, the monitoring agent is not required to always monitor the vehicle, and is capable of making determination on the monitoring work by referring to the recommended monitoring information. Hence, the burden of monitoring imposed on the monitoring agent can be reduced. Moreover, reduced burden of monitoring allows the vehicles under control to be monitored such that the number of monitoring agents is less than the number of vehicles under control.

For example, it may be that the trained model is a neural network model obtained by machine learning in which the first situational information is used as input data and the first monitoring result is used as reference data.

According to the above aspect, the trained model is a neural network model, and thus, the trained model can be easily generated even when the relationship between the situational information and the monitoring result is complicated.

For example, it may be that the first monitoring result includes information indicating a vehicle targeted for monitoring by the first monitoring agent.

According to the above aspect, the trained model is constructed based on the information indicating the vehicle targeted for monitoring at the first time point. Accordingly, by learning the characteristics of the vehicle selected as the vehicle targeted for monitoring, the accuracy (in other words, appropriateness) of the recommended content output by the trained model about the vehicle characteristics can be increased. Hence, the effect of reducing the burden of monitoring imposed on the monitoring agent can be increased.

For example, it may be that the first monitoring result includes information identifying an operation performed by the first monitoring agent on a vehicle targeted for monitoring by the first monitoring agent.

According to the above aspect, the trained model is constructed based on the information identifying the operation performed by the monitoring agent on the vehicle targeted for monitoring at the first time point. Accordingly, by learning the operation performed on the vehicle selected as the vehicle targeted for monitoring, the accuracy of the recommended content output by the trained model about the operation performed can be increased. Hence, the effect of reducing the burden of monitoring imposed on the monitoring agent can be increased.

For example, it may be that the first monitoring result includes information identifying at least one of a time period or a time related to monitoring performed by the first monitoring agent.

According to the above aspect, the trained model is constructed based on the information identifying the time period or the time related to the monitoring at the first time point. Accordingly, by learning the time period used for monitoring the vehicle selected as the vehicle targeted for monitoring, the accuracy of the recommended content output by the trained model about the time period used for the monitoring can be increased. Hence, the effect of reducing the burden of monitoring imposed on the monitoring agent can be increased.

For example, it may be that the first monitoring result includes information identifying a time period during which a vehicle is continuously untargeted for monitoring after the vehicle was targeted for monitoring by the first monitoring agent.

According to the above aspect, the trained model is constructed based on the information identifying the time period during which the vehicle is continuously untargeted for monitoring after the vehicle was targeted for monitoring at the first time point. Accordingly, by learning the non-monitored vehicle and the non-monitored time period, the accuracy of the recommended content output by the trained model about the non-monitored vehicle and the non-monitored time period can be increased. Hence, the effect of reducing the burden of monitoring imposed on the monitoring agent can be increased.

For example, it may be that the first monitoring result includes information identifying a time period taken from when the first situational information is presented till when the first monitoring agent identifies a vehicle to be monitored.

According to the above aspect, the trained model is constructed based on the information indicating the time period taken from when the situation at the first time point is presented till when the vehicle to be monitored is identified by the monitoring agent, that is, till the start of the monitoring. Hence, the accuracy of the recommended content output by the trained model about the time period taken till the start of the monitoring can be increased.

For example, it may be that the first monitoring result further includes information related to the first monitoring agent, the trained model is obtained by machine learning in which the information related to the first monitoring agent is further used, and the recommended content is determined by further inputting information related to the second monitoring agent to the trained model.

According to the above aspect, the trained model is constructed not only based on the monitoring result, but also the information related to the monitoring agent at the first time point. Accordingly, the accuracy of the recommended content can be further increased.

For example, it may be that the information related to the first monitoring agent includes at least one of identification information, work history information, or attribute information of the first monitoring agent, and the information related to the second monitoring agent includes at least one of identification information, work history information, or attribute information of the second monitoring agent.

According to the above aspect, the leering model is constructed based on the experience or the characteristics of the first monitoring agent. Accordingly, the recommended content corresponding to the experience or characteristics of the second monitoring agent can be determined. Hence, the accuracy of the recommended content can be further increased.

For example, it may be that the information related to the first monitoring agent includes terminal information related to a terminal used by the first monitoring agent for monitoring, and the information related to the second monitoring agent includes terminal information related to a terminal to be used by the second monitoring agent for monitoring.

According to the above aspect, the leering model is constructed based on the state or the characteristics of the terminal operated by the first monitoring agent. Accordingly, the recommended content corresponding to the state or characteristics of the terminal to be operated by the second monitoring agent can be determined. Hence, the accuracy of the recommended content can be further increased.

For example, the information processing method may further include: obtaining a second monitoring result which is a result of monitoring by the second monitoring agent; and updating the trained model by machine learning in which the second situational information is used as input data and the second monitoring result is used as reference data.

According to the above aspect, the trained model is updated by using the monitoring result at the second time point. Accordingly, the trained model can be continuously improved, leading to a sustainable monitoring system.

For example, it may be that when the trained model is updated, the trained model is updated by preferentially using the second situational information and the second monitoring result corresponding to the second monitoring agent identified by work history information of the first monitoring agent.

According to the above aspect, the trained model is updated by preferentially using the monitoring result of the monitoring agent identified based on the work history of the monitoring agent at the first time point. Accordingly, by updating the trained model using the monitoring result of the monitoring agent which serves as a model, the trained model can be efficiently updated.

For example, it may be that the recommended content includes a recommended monitoring target vehicle, and the presentation information includes information indicating the recommended monitoring target vehicle included in the recommended content.

According to the above aspect, as the information related to vehicle monitoring recommended at the second time point, the recommended monitoring target vehicle is presented on the presentation device. Accordingly, the monitoring agent is capable of directly perceiving the recommended monitoring target vehicle at the second time point.

For example, it may be that the recommended content includes one or more vehicles which are potential monitoring targets and a monitoring recommended level of each of the one or more vehicles, and the presentation information includes information indicating the monitoring recommended level of each of the one or more vehicles included in the recommended content.

According to the above aspect, as the information related to vehicle monitoring recommended at the second time point, one or more vehicles and the monitoring recommended levels are presented on the presentation device. Accordingly, the monitoring agent is capable of easily perceiving the vehicle to be monitored at the second time point from among the presented one or more vehicles.

For example, it may be that the recommended content includes a monitoring direction as seen from the recommended monitoring target vehicle, and the presentation information includes an image captured from the recommended monitoring target vehicle in the monitoring direction included in the recommended content.

According to the above aspect, as the information related to vehicle monitoring recommended at the second time point, information indicating the monitoring direction is presented on the presentation device. Accordingly, the monitoring agent is capable of easily perceiving the direction to be monitored at the second time point.

For example, it may be that the recommended content includes a point to be monitored recommended to the second monitoring agent, and the presentation information includes information indicating the point to be monitored included in the recommended content.

According to the above aspect, as the information related to the vehicle monitoring recommended at the second time point, information indicating points to be monitored are presented on the presentation device. Accordingly, the monitoring agent is capable of perceiving the points to be monitored without making determination based on the situation at the second time point. Alternatively, determination on the points to be monitored can be assisted.

An information processing system according to one aspect of the present disclosure includes: an obtaining unit which obtains second situational information related to a situation of at least one of a vehicle or surroundings of the vehicle at a second time point subsequent to a first time point; a determination unit which determines recommended content by inputting the second situational information to a trained model obtained by machine learning in which first situational information and a first monitoring result are used, the recommended content being related to vehicle monitoring recommended to a second monitoring agent, the first situational information being related to a situation of at least one of the vehicle or the surroundings of the vehicle at the first time point, the first monitoring result being a result of monitoring by a first monitoring agent based on the first situational information; and an output unit which generates presentation information for the vehicle monitoring based on the recommended content determined, and causes a presentation device to output the presentation information.

With this, similar advantageous effects as the information processing method can be obtained.

General and specific aspects disclosed above may be implemented using a system, a device, an integrated circuit, a computer program, or a computer-readable recording medium, such as a CD-ROM, or any combination of systems, devices, integrated circuits, computer programs, or computer-readable recording media.

An embodiment will be specifically described below with reference to the drawings.

Note that the embodiment described below shows a general or specific example of the present disclosure. The numerical values, shapes, materials, structural elements, the arrangement and connection of the structural elements, steps, the processing order of the steps, etc., indicated in the following embodiment are mere examples, and therefore do not intend to limit the present disclosure. Therefore, among structural elements in the following embodiment, those not recited in any of the independent claims defining the most generic part of the inventive concept are described as optional structural elements.

Embodiment

In the present embodiment, an information processing method and the like capable of reducing the burden of monitoring imposed on a monitoring agent will be described.

A remote monitoring system (hereinafter, may also simply be referred to as a monitoring system) obtains resultant sensing data via a communication means from a monitored vehicle and transmits the resultant sensing data to a monitoring agent. The monitoring agent perceives the state of the monitored vehicle and the state of the surroundings of the monitored vehicle based on the transmitted resultant sensing data, and determines whether or not intervention by an operator to the monitored vehicle is required. The monitoring agent may consider an appropriate intervention method including a method in which an operator indirectly operates the vehicle. When the monitoring agent determines the autonomous running of the monitored vehicle to be difficult, the monitoring agent requests the operator to perform a remote operation. The operator remotely controls the monitored vehicle by transmitting a control signal for controlling the running of the vehicle to the monitored vehicle (that is, the vehicle under control). When the operator is the monitoring agent, the operator may shift from monitoring to operation.

Figure 2:
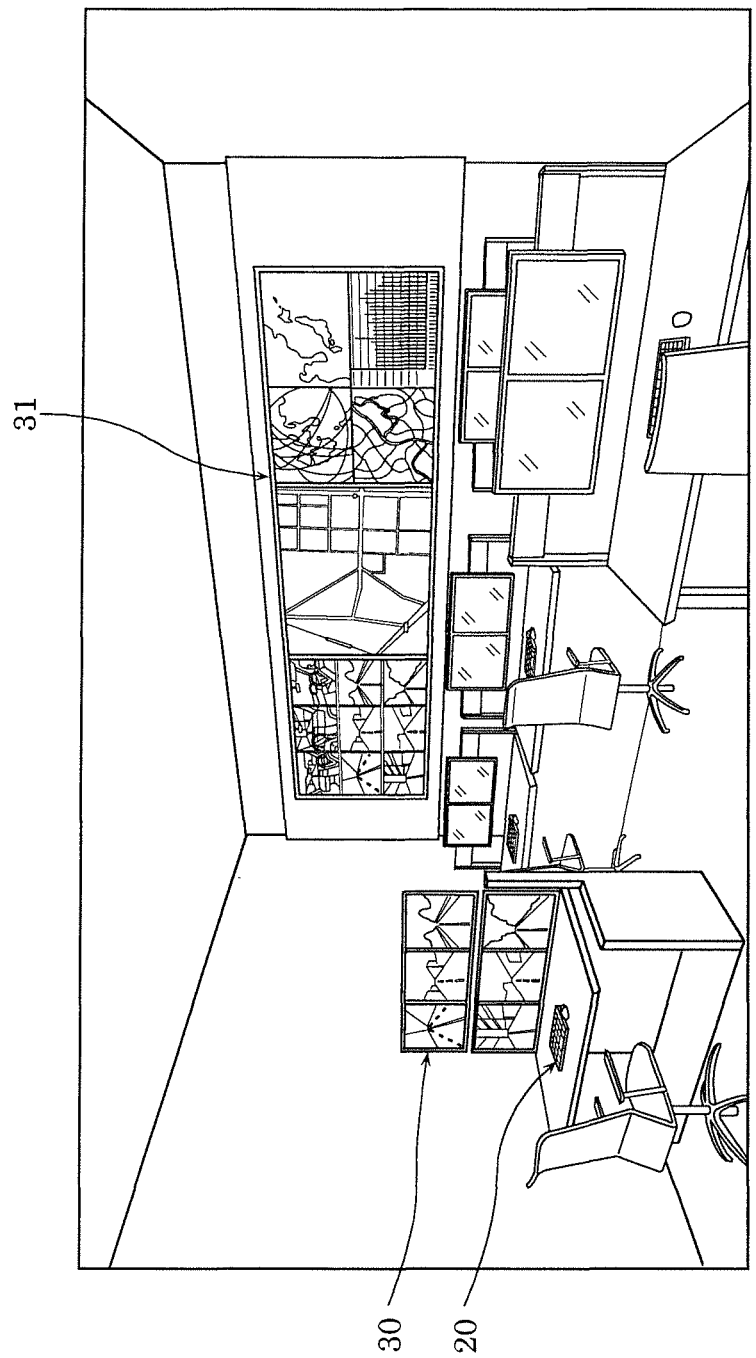
FIG. 2 is a general view of an example of a monitoring room according to the embodiment.

FIG. 1 is a block diagram of a configuration of monitoring system 1 according to an embodiment. FIG. 2 is a general view of an example of a monitoring room according to the present embodiment.

Monitoring system 1 illustrated in FIG. 1 is an information processing system for monitoring vehicles M1, M2, . . . , MN which can be vehicles under control. Hereinafter, vehicles M1, M2, . . . , MN may also be referred to as "vehicles M1 etc.". The monitoring room illustrated in FIG. 2 is a room for one or more monitoring agents to monitor vehicles M1 etc. In the monitoring room, information obtained from vehicles M1 etc. and information for monitoring vehicles M1 etc. are presented to a monitoring agent, so that the monitoring agent can perform an operation for monitoring. In addition to the operation performed by the monitoring agent for monitoring, an operation for remotely operating the vehicle under control may be performed. The monitoring agent may be an operator who operates the vehicle under control, or may be a person different from the operator.

As illustrated in FIG. 1, monitoring system 1 includes server device 10, input device 20, and display device 30.

Server device 10 is a processing device which makes determination related to monitoring performed by the monitoring agent. Specifically, server device 10 makes determination related to monitoring by information processing performed by a computer using the details input to input device 20 and vehicle information obtained from vehicles M1 etc. Server device 10 is disposed in a place which can be communicatively connected to network N, and the physical location of server device 10 may be any location. For example, when server device 10 is disposed inside or near the monitoring room, there is an advantage that communication between input device 20 and display device 30 can be performed within a short period.

Input device 20 is an input device which receives an operation performed by the monitoring agent. Input device 20 may be a keyboard, a mouse, or a touch panel connected to server device 10, or may be a button operable by a press, contact or the like. Input device 20 provides information related to the input operation to server device 10. Input device 20 is disposed in a monitoring room. When server device 10 is disposed at a remote location, input device 20 and server device 10 may be connected to each other via a network.

Display device 30 is a device which obtains presentation information from server device 10, and outputs the presentation information as an image. The image includes, for example, photographs, illustrations, and characters. Examples of display device 30 include a liquid crystal display. The image output by display device 30 is viewed by the monitoring agent, and is used to determine which vehicle is to be monitored by the monitoring agent, or how to monitor the vehicle. Display device 30 is an example of a presentation device. Monitoring system 1 may include, as a presentation device, a device which outputs sound, in addition to display device 30 or instead of display device 30. Display device 30 is disposed in the monitoring room. When server device 10 is remotely disposed, display device 30 and server device 10 may be connected to each other via a network.

Vehicle M1 is a vehicle in which a person is riding or not riding, and is, for example, an automatically driven vehicle. Vehicle M1 is a vehicle which can be a target for monitoring by the monitoring agent. Vehicle M1 is present in an outside space different from the monitoring room, such as a road or a parking.

Vehicle M1 includes a communication interface. Vehicle M1 is connected to network N via communication, and is communicatively connected to server device 10 via network N. Vehicle M1 includes one or more cameras which capture an image of surroundings of vehicle M1, and a plurality of sensors which detect, for example, the position, speed, acceleration, steering angle, and fuel level of vehicle M1, operating states of indicators, operating state of anti-lock braking system (ABS) or automatic emergency braking (AEB), the number of objects around vehicle M1, types of objects around vehicle M1, and a distance to each object around vehicle M1. Vehicle M1 transmits, to server device 10 via the communication interface and network N, image data generated by capturing of one or more cameras and information, such as the position obtained by the sensors, and information including sensing data. The information transmitted by vehicle M1 is also referred to as vehicle information. As necessary, acceleration, deceleration, steering angle, and the like of vehicle M1 can be controlled by the monitoring agent via network N. Such control performed by the monitoring agent may also be referred to as a remote operation.

Vehicles M2 to MN are vehicles similar to vehicle M1, and move independently from vehicle M1. Each of vehicles M2 to MN transmits the image data and sensing data generated by their own devices to server device 10 in a similar manner to vehicle M1.

Network N is a communication network to which server device 10 and vehicles M1 etc. are connected. The communication standard or the communication method of network N is a wide area communication network which uses, for example, a mobile phone network, a satellite communication network, or Wi-fi but the communication standard or the communication method is not limited to such examples. The portion of network N connected to vehicles M1 etc. is a wireless network.

Input device 20 and display device 30 are disposed in the monitoring room. Input device 20 and display device 30 are disposed at such positions that the monitoring agent can easily input data to input device 20 and easily view display device 30. For example, input device 20 and display device 30 are arranged on the desk in front of the chair on which the monitoring agent sits. Moreover, display device 31, which displays the image data obtained by vehicles M1 etc. and an image, such as a map which indicates, for example, the position of vehicle M1, is disposed at a position which can be viewed from the entire monitoring room.

The number of monitoring agents can be two or more, but is less than the number of vehicles M1 etc. The monitoring agent does not always monitor everything including vehicles M1 etc., but selects and monitors only one or more vehicles that are determined to need monitoring. Accordingly, it is assumed that the monitoring agent does not monitor the other vehicles. In this way, the number of personnel required for monitoring can be reduced, and the monitoring agent is capable of performing monitoring focusing on the vehicles that need monitoring. Examples of the cases where monitoring is determined to be needed include a case where the vehicle is present at a position where running of the vehicle requires attention, a case where the vehicle is in a state where running of the vehicle requires attention, a case where the vehicle is approaching the position which requires attention, and a case where the vehicle is expected to be turn into a state which requires attention.

The monitoring agent views the image presented by display device 30 to determine, for example, which vehicle among vehicles M1 etc. is to be monitored or how to monitor the vehicle. The monitoring agent then inputs the vehicle targeted for monitoring or the monitoring method to server device 10 via input device 20.

Hereinafter, processing performed by server device 10 for generating information for recommending which vehicle is to be monitored to the monitoring agent will be described in detail. In this case, the monitoring agent determines the vehicle to be monitored based on the information presented by display device 30. An appropriate recommendation of the monitoring target by server device 10 can reduce the burden of work performed by the monitoring agent for searching vehicles M1 etc. for a monitoring target.

Figure 3:
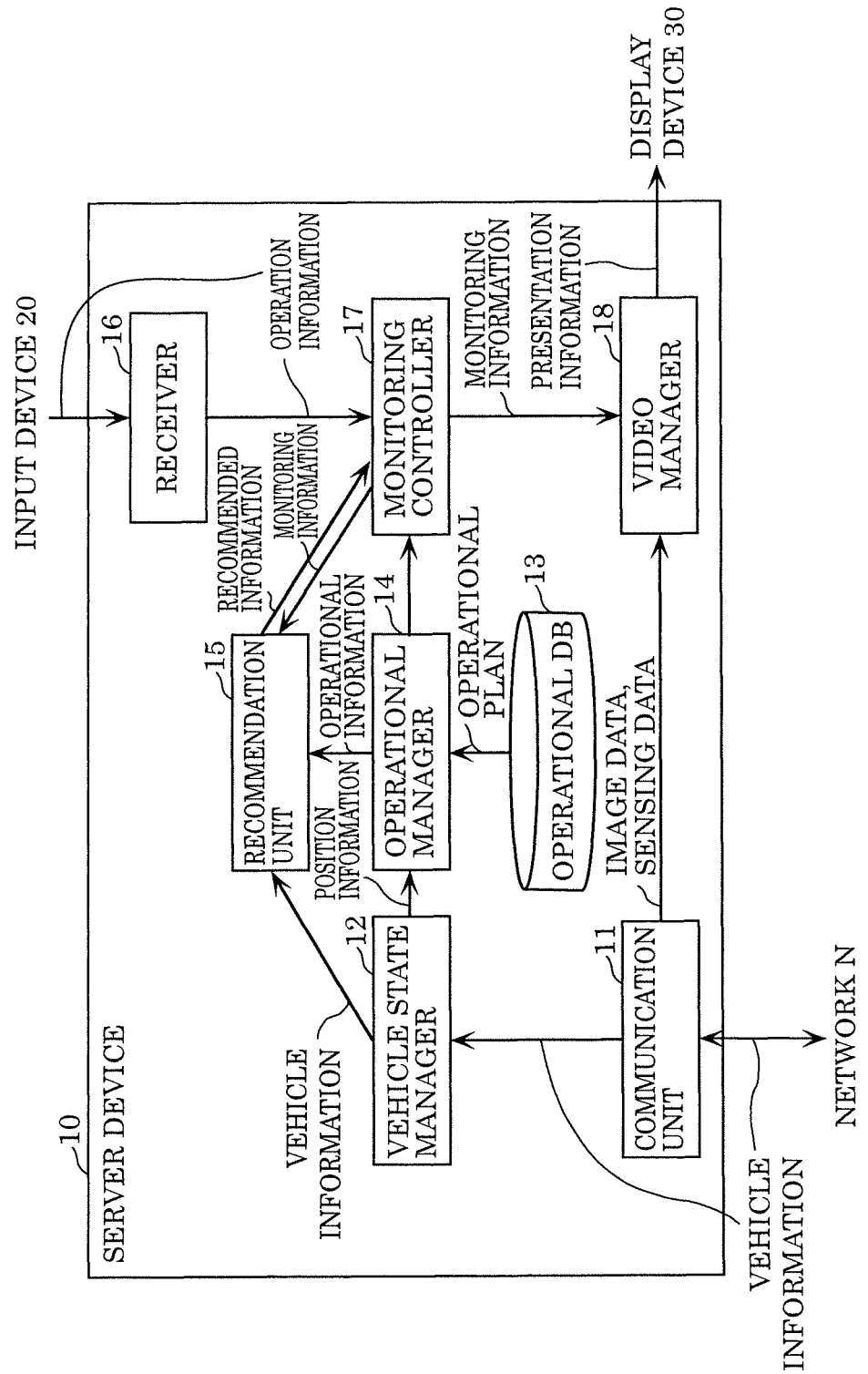
FIG. 3 is a block diagram of a functional configuration of a server device according to the embodiment.

FIG. 3 is a block diagram of a functional configuration of server device 10 according to the present embodiment.

As illustrated in FIG. 3, server device 10 includes communication unit 11, vehicle state manager 12, operational database (DB) 13, operational manager 14, recommendation unit 15, receiver 16, monitoring controller 17, and video manager 18.

Communication unit 11 is a communication interface connected to network N, and communicatively connected to vehicles M1 etc., via network N. Communication unit 11 obtains vehicle information from vehicles M1 etc.

Vehicle manger 12 is a processor which manages vehicles M1 etc. Vehicle state manager 12 obtains the vehicle information transmitted by vehicles M1 etc., and manages, for example, the position, speed, and running state of each of vehicles M1 etc., based on the obtained vehicle information.

Operational DB 13 is a database which stores information for an operation of vehicles M1 etc. Operational DB 13 holds map and operational plan information as information for an operation of vehicles M1 etc. Examples of the operational plan include information indicating the scheduled travel path of vehicles M1 etc., and information indicating scheduled positions along the paths of vehicles M1 etc. at respective time points during traveling.

Operational manager 14 is a processor which manages an operation of vehicles M1 etc. Operational manager 14 obtains information, such as operational plans of vehicles M1 etc., from operational DB 13, and transmits instruction information including, for example, the travel paths of vehicles M1 etc. to vehicles M1 etc. Moreover, operational manager 14 determines operational information including, for example, the delayed travel time of vehicles M1 etc. relative to the operational plans.

Recommendation unit 15 is a processor which generates information for recommending, to the monitoring agent, a monitoring target vehicle to be monitored by the monitoring agent. Recommendation unit 15 obtains the vehicle information transmitted by vehicles M1 etc. from vehicle state manager 12, obtains the operational information related to an operation of vehicles M1 etc. from operational manager 14, and obtains, from monitoring controller 17, monitoring information indicating the monitoring target determined by the monitoring agent based on the vehicle information and the operational information. Recommendation unit 15 then generates recommended information for recommending, to the monitoring agent, the target vehicle to be monitored by the monitoring agent based on the obtained vehicle information, operational information, and monitoring information. The recommended information is indicated, for each vehicle, by, for example, the monitoring recommended level indicating the recommended level for a monitoring target. Moreover, the recommended information may be a monitoring priority level indicating, for each vehicle, the priority level of preferentially monitoring the vehicle compared to the other vehicles.

When generating the recommended information, recommendation unit 15 generates the recommended information by using a trained model constructed by using the past monitoring result of the monitoring agent. The recommended information includes information indicating the monitoring target vehicle. The vehicle information, the operational information, and the monitoring information may also be referred to as situational information.

Receiver 16 is a processor which receives operation information indicating an operation input by the monitoring agent to input device 20. The operation information includes, for example, an operation for switching the monitoring target.

Monitoring controller 17 is a processor which determines a vehicle targeted for monitoring. Monitoring controller 17 determines the monitoring target vehicle, based on the recommended information generated by recommendation unit 15 and the operation information received by receiver 16, and generates monitoring information indicating the monitoring target vehicle. Monitoring controller 17 provides the generated monitoring information to video manger 18, and provides the generated monitoring information to recommendation unit 15 as a first monitoring result.

The monitoring information generated by monitoring controller 17 may include information for identifying the operation performed by the monitoring agent on the vehicle targeted for monitoring. Moreover, the monitoring information may include information for identifying at least one of the time period or time related to the vehicle monitoring. Specifically, the monitoring information may include the start and end times of the vehicle monitoring, the time period during which the vehicle monitoring has continued, the time period during which a vehicle is continuously untargeted for monitoring after the vehicle was targeted for monitoring, and the time period taken from when the first situational information is presented till when a first monitoring agent identifies a vehicle to be monitored. In addition, the monitoring information may include, for example, information indicating whether or not the monitoring agent has remotely operated the vehicle, information related to the monitoring agent (specifically, identification information, work history information, attribute information, history of monitoring experience, proficiency, or continuous duty hours). The monitoring information may also include information related to the terminal used by the monitoring agent for monitoring (such as input device 20 or display device 30).

Monitoring controller 17 has an automatic update mode and a manual update mode as operating modes related to the determination of the monitoring target vehicle. The automatic update mode is a mode in which, regardless of whether the operation information has been received or not or regardless of the details of the received operation information, the monitoring target vehicle is determined according to the recommended information, and monitoring information is generated. The manual update mode is a mode in which, regardless of presence of the recommended information, or regardless of the details of the recommended information, the monitoring target vehicle is determined according to the operation information, and the monitoring information is generated.

Video manager 18 is a processor which manages video to be displayed on display device 30. Video manager 18 generates presentation information including image data related to the video to be displayed on display device 30, and outputs the generated presentation information to display device 30. Video manager 18 obtains the monitoring information from monitoring controller 17. In the case where the monitoring information includes information for identifying the vehicle targeted for monitoring, video manager 18 includes, in the presentation information, the image data received by communication unit 11 from the vehicle targeted for monitoring.

Specifically, the presentation information may include information indicating a recommended monitoring target vehicle included in the recommended content. In addition, in the case where the recommended content includes one or more vehicles which are potential monitoring targets and the monitoring recommended level of each of the vehicles, the presentation information may include information indicating the monitoring priority level of each of the vehicles included in the recommended content. Moreover, in the case where the recommended content includes the direction of the monitoring as seen from the recommended monitoring target vehicle, the presentation information may include an image captured by the recommended monitoring vehicle in the monitoring direction included in the recommended content.

Moreover, the recommended content may include points to be monitored recommended to a second monitoring agent, and the presentation information may include information indicating the points to be monitored included in the recommended content.

Figure 4:
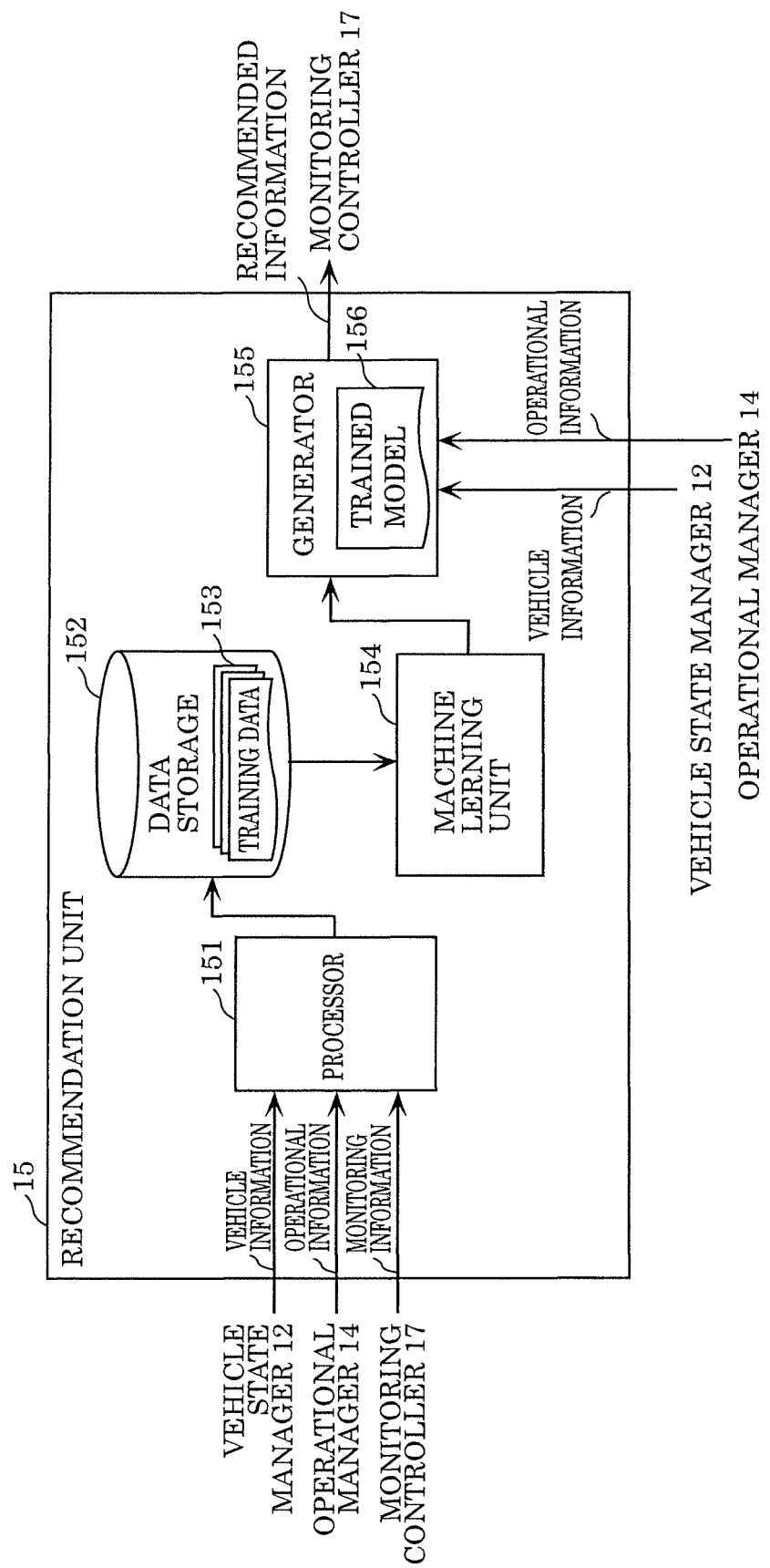
FIG. 4 is a block diagram of a detailed functional configuration of a recommendation unit according to the embodiment.

FIG. 4 is a block diagram of a detailed functional configuration of recommendation unit 15 according to the present embodiment.

As illustrated in FIG. 4, recommendation unit 15 includes processor 151, data storage 152, machine learning unit 154, and generator 155.

Processor 151 is a processor which obtains input data and reference data used for learning by machine learning unit 154, and executes processing for processing or converting the obtained input data and reference data into a format suitable for learning. As the input data and the reference data, processor 151 obtains the vehicle information from vehicle state manager 12, obtains the operational information from operational manager 14, and obtains the monitoring information from monitoring controller 17. The vehicle information, the operational information, and the monitoring information obtained by processor 151 are also referred to as situational information.

Processor 151 then performs processing on the obtained situational information. Examples of the processing include, for example, dividing the vehicle information into information pieces of sections each having a predetermined time length (such as ten seconds), calculating an average value, a maximum value, and a minimum value of the acceleration and the like included in each section or a statistical value such as a variance, and generating flag information based on a magnitude comparison with a threshold or condition determination relative to an acceleration and the like in each section. Specifically, the processing includes, for example, generating flag information indicating that the average speed in each section exceeds the speed limit, generating flag information indicating whether sudden acceleration or sudden braking has been made in each section based on the fact that the acceleration in the section exceeds or falls below a threshold, or generating flag information indicating that the time period during which the vehicle is stopped has exceeded a threshold. Moreover, processor 151 extracts, for example, information indicating the monitoring target vehicle included in the monitoring information.

Processor 151 stores the vehicle information, the operational information, and the monitoring information which have been obtained at the same time point, and the information generated by the above processing from these information items in data storage 152 as training data 153 in association with each other.

Note that the time point when the information stored in data storage 152 was obtained is also referred to as a first time point, and the situational information at the first time point is also referred to as first situational information. The predetermined time length is, for example, ten seconds, and the following describes such a case as an example.

Data storage 152 is a storage where various types of information after being processed by processor 151 is stored as training data 153. Training data 153 is information obtained from vehicles M1 etc. at a past time point previous to the current time point. Training data 153 is read out by machine learning unit 154. Data storage 152 is implemented by, for example, a storage device, such as a hard disk drive (HDD) or a solid state drive (SSD).

Machine learning unit 154 is a processor which constructs a trained model by machine learning. Machine learning unit 154 constructs trained model 156 for determining the monitoring target vehicle recommended to the monitoring agent by performing learning processing related to the machine learning using training data 153 stored in data storage 152. The vehicle information and the operational information included in training data 153 and the information generated by processing performed by processor 151 based on the vehicle information and the operational information are used for the input data of machine learning by machine learning unit 154. As the reference data of machine learning by machine learning unit 154, the monitoring information included in training data 153 is used. The monitoring information included in training data 153 is also referred to as a first monitoring result, and the monitoring agent who performed monitoring related to the monitoring information is also referred to as a first monitoring agent. In other words, trained model 156 constructed by machine learning unit 154 is a model obtained by machine learning in which the first situational information is used as the input data and the first monitoring result is used as the reference data. Machine learning unit 154 provides constructed trained model 156 to generator 155. Example of machine learning include a neural network learning method such as deep learning. The learning method is not limited to such an example, and may be any one of other learning methods, such as genetic programing, decision tree, Bayesian network, or support vector machine (SVM).

In the case where training data 153 includes work history information of the monitoring agent, machine learning unit 154 may update the trained model by preferentially using the second situational information and the second monitoring result corresponding to the second monitoring agent identified from the work history information. Specifically, based on the work history information, learning may be performed so as to preferentially recommend a monitoring agent who is highly experienced in the work.

Generator 155 determines the recommended content for recommending the monitoring target vehicle or the vehicle monitoring method to the monitoring agent by using trained model 156, and generates recommended information indicating the recommended content. Generator 155 obtains the vehicle information from vehicle state manager 12, and obtains the operational information from operational manager 14. Generator 155 then provides, to monitoring controller 17, the recommended information indicating the recommended content which is the output data output by inputting the obtained vehicle information and operational information to trained model 156. The time point when the vehicle information and the operational information were obtained by generator 155 is also referred to as a second time point, and the situational information at the second time point is also referred to as second situational information. The monitoring agent targeted for the recommendation related to the recommended information generated by generator 155 is also referred to as a second monitoring agent.

Next, two examples of the input data and the reference data included in training data 153 stored in data storage 152 will be described.

Figure 5:
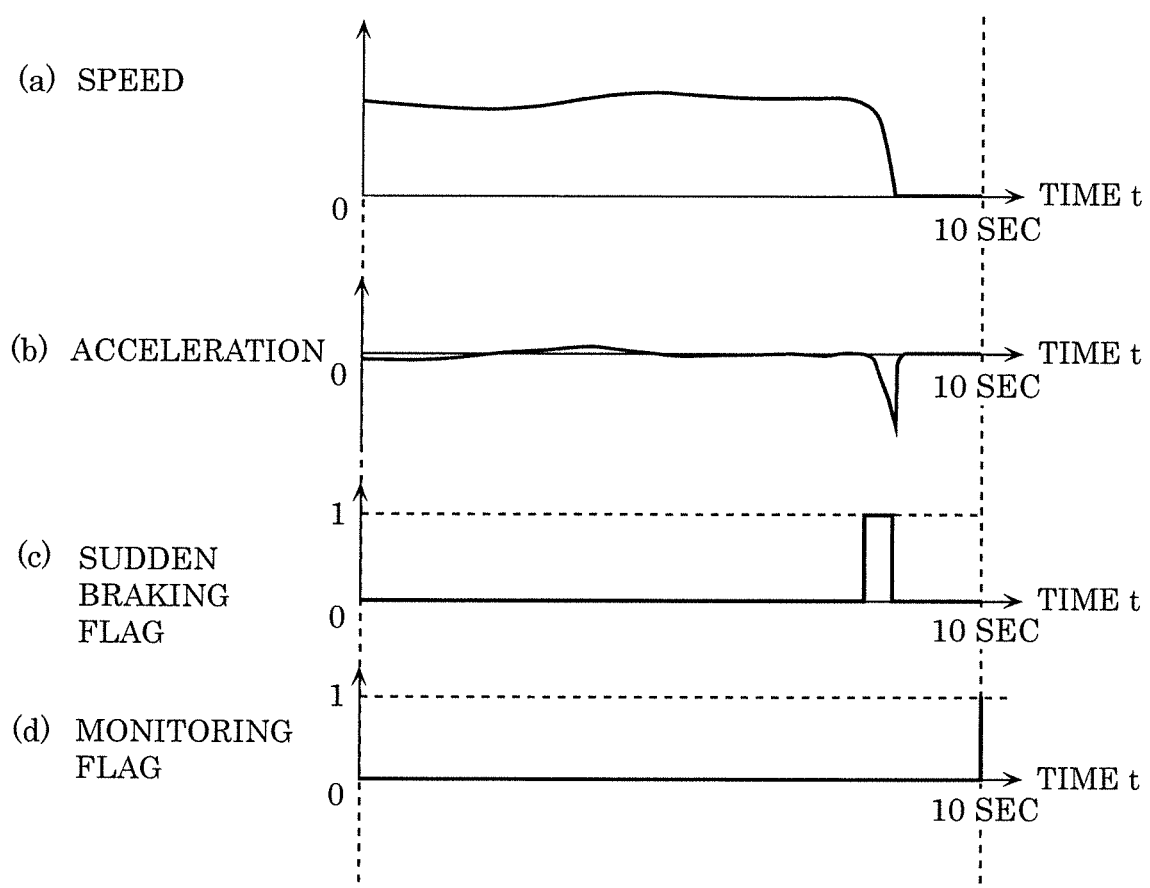
FIG. 5 illustrates a first example of training data according to the embodiment.

FIG. 5 illustrates a first example of training data 153 according to the present embodiment. Training data 153 illustrated in FIG. 5 is vehicle information for ten second period including the time point when the vehicle was stopped by sudden braking, and is an example of training data 153 when monitoring was performed by the monitoring agent.

Figure 6:
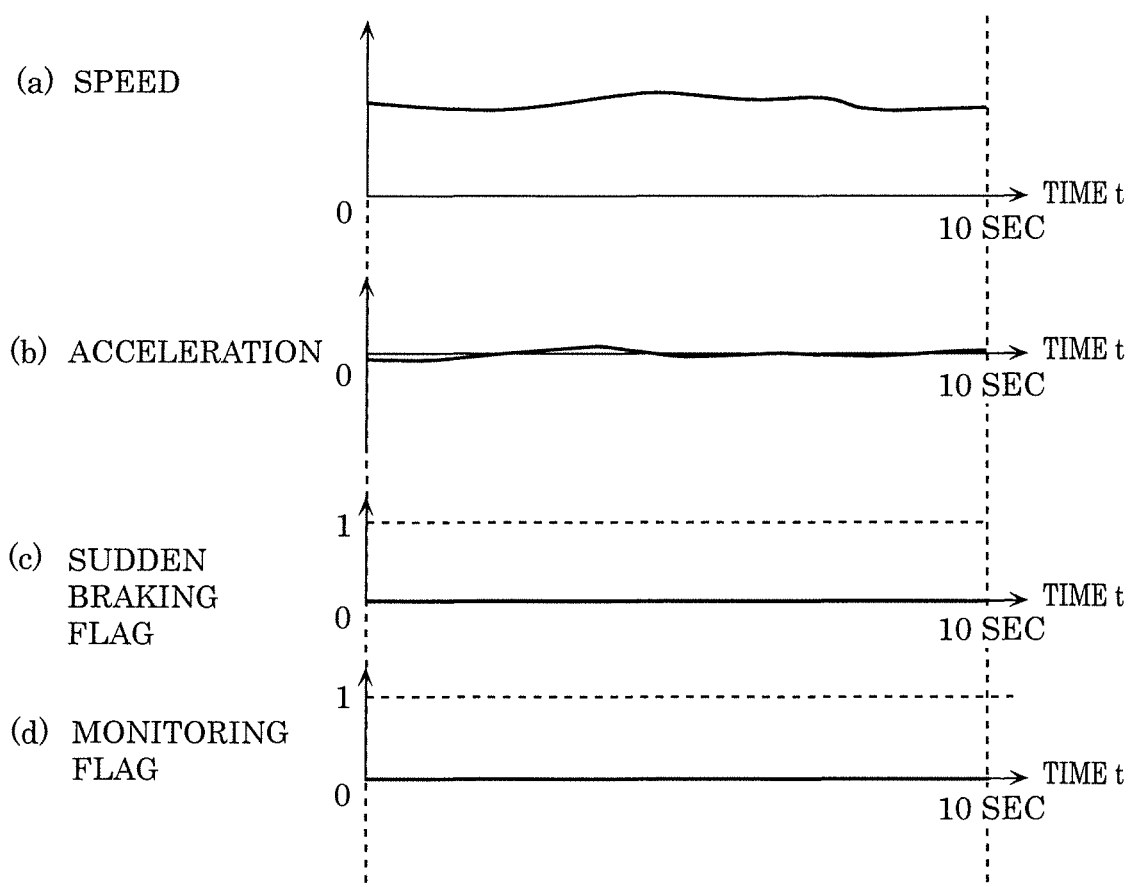
FIG. 6 illustrates a second example of the training data according to the embodiment.

In FIG. 5, (a) is a graph indicating the speed data for the ten second period where the horizontal axis represents time t and the vertical axis represents speed. The horizontal axis indicates relative time with the start point of the ten second period being time zero. In (a) of FIG. 5, it is indicated that the speed suddenly dropped when about eight seconds passed from the start point of the ten second period. The representations of the vertical axis and the horizontal axis in each of subsequent (b) to (d) of FIG. 5 and (a) to (d) of FIG. 6 are the same as those in (a) of FIG. 5.

In FIG. 5, (b) is a graph indicating the acceleration data for the ten second period. In (b) of FIG. 5, it is indicated that the acceleration suddenly changed in the negative direction when about eight seconds passed after the start point of the period. In FIG. 5, (b) may indicate the acceleration data obtained by the acceleration sensor included in vehicle M1, or may be the data obtained by differentiating the speed data in (a) of FIG. 5.

In FIG. 5, (c) is a graph indicating a sudden braking flag for the ten second period. The sudden braking flag refers to flag information indicating the time point when a sudden braking is made as "1". In (c) of FIG. 5, it is indicated that when about eight seconds passed after the start point of the ten second period, the sudden braking flag changed into 1, and when the sudden braking was released, the sudden braking flag changed into 0. In FIG. 5, (c) may indicate the data detected by a sensor included in vehicle M1 (for example, a rotary speed sensor of a tire or a braking switch) which can detect sudden braking, or may be data obtained by extracting the time period in which the acceleration in (b) of FIG. 5 is greater than a predetermined value in the negative direction.

In FIG. 5, (d) is a graph indicating a monitoring flag for the ten second period. The monitoring flag is flag information indicating the time point when monitoring by the monitoring agent starts as "1". In FIG. 5, (d) indicates that the monitoring flag is 1 at the end point of the period. This indicates that the monitoring agent started monitoring the vehicle upon determination of the monitoring of the vehicle based on each data in (a) to (c) of FIG. 5 and the other data. For example, (d) of FIG. 5 indicates that the monitoring flag became 1 at the end point of the period based on that the monitoring agent determined that a sudden braking operation was performed from the change in sudden braking flag indicated in (c) of FIG. 5 and started to monitor the vehicle.

FIG. 6 illustrates a second example of training data 153 according to the present embodiment.

Training data 153 illustrated in FIG. 6 is vehicle information for ten second period during which the vehicle traveled at an approximately equal speed, and is an example of training data 153 when the vehicle was not monitored by the monitoring agent.

In FIG. 6, (a) is a graph indicating the acceleration data of the ten second period. In (a) of FIG. 6, it is indicated that the vehicle traveled at an approximately equal speed from the start to the end of the period.

In FIG. 6, (b) is a graph indicating the acceleration data for the ten second period. In FIG. 6, (b) indicates that the acceleration was almost zero from the start to the end of the period.

In FIG. 6, (c) is a graph indicating a sudden braking flag for the ten second period. In FIG. 6, (c) indicates that the sudden braking flag was zero during the period, that is, sudden braking did not occur.

In FIG. 6, (d) is a graph indicating a monitoring flag for the ten second period. In FIG. 6, (d) indicates that the monitoring flag is zero during the period. This indicates that the monitoring agent determined not to monitor the vehicle based on each data in (a) to (c) of FIG. 6 and the other data. For example, (d) of FIG. 6 indicates that the monitoring flag is zero during the period based on that the monitoring agent determined that monitoring of the vehicle was unnecessary because no sudden braking occurred as illustrated in (c) of FIG. 6.

The information illustrated in (a), (b), and (c) of FIG. 5 and FIG. 6 are used as the input data for learning by machine learning unit 154, and the monitoring flags indicated in (d) of FIG. 5 and FIG. 6 are used as the reference data for learning by machine learning unit 154.

Next, two examples of the recommended information output by recommendation unit 15 will be described.

Figure 7:
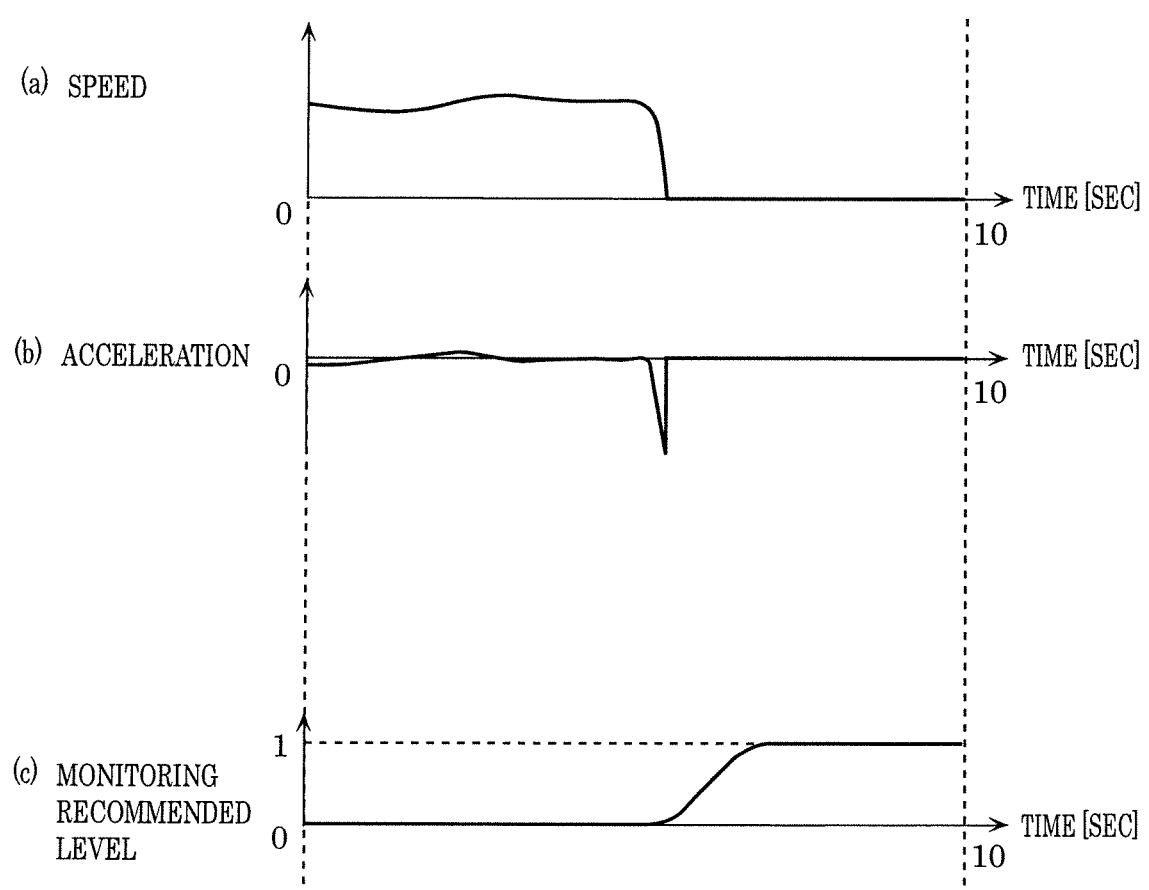
FIG. 7 illustrates a first example of recommended information output by the recommendation unit according to the embodiment.

FIG. 7 illustrates a first example of the recommended information output by recommendation unit 15 according to the present embodiment. The recommended information illustrated in FIG. 7 is vehicle information for ten second period including the time point when the vehicle was stopped by sudden braking, and is an example in which the monitoring recommended level is output as the recommended information. The representations of the vertical axis and the horizontal axis in each of (a) to (c) of FIG. 7 are the same as those in (a) of FIG. 5.

In FIG. 7, (a) is a graph indicating the speed data for the ten second period. In (a) of FIG. 7, it is indicated that the speed suddenly dropped when about five seconds passed from the start of the period.

In FIG. 7, (b) is a graph indicating the acceleration data for the ten second period. In (b) of FIG. 7, it is indicated that the acceleration suddenly changed in the negative direction when about five seconds passed after the start point of the period. In FIG. 7, (b) may indicate the acceleration data obtained by the acceleration sensor included in vehicle M1, or may indicate the data obtained by differentiating the speed data in (a) of FIG. 7.

In FIG. 7, (c) indicates an example of the monitoring recommended level output by inputting the speed data and the acceleration data indicated in (a) and (b) of FIG. 7 to learning model 156 as input data. The monitoring recommended level indicated by (c) of FIG. 7 is zero till when the vehicle was stopped by sudden braking, and gradually increases and reaching 1 after the time point when the vehicle was stopped by sudden braking. This is because learning model 156 was constructed based on that the monitoring information, indicating that the monitoring agent started to monitor the vehicle in an approximately a few seconds after sudden braking of the vehicle was included in learning data 153.

Figure 8:
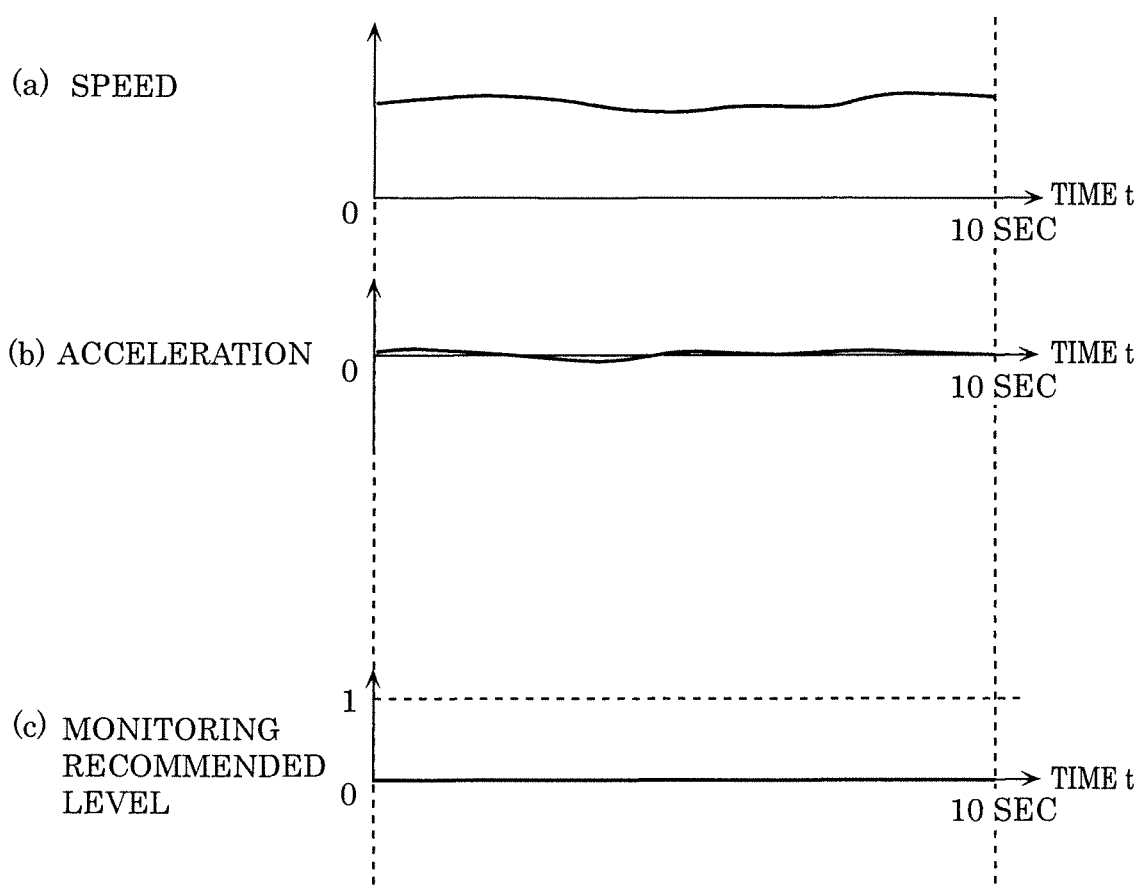
FIG. 8 illustrates a second example of the recommended information output by the recommendation unit according to the embodiment.

FIG. 8 illustrates a second example of the recommended information output by recommendation unit 15 according to the present embodiment.

The recommended information illustrated in FIG. 8 is vehicle information for ten second period during which the vehicle traveled at an approximately equal speed, and is an example in which the monitoring recommended level is output as the recommended information. The representations of the vertical axis and the horizontal axis in each of (a) to (c) of FIG. 8 are the same as those in (a) of FIG. 5.

In FIG. 8, (a) is a graph indicating the speed data for the ten second period. In (a) of FIG. 8, it is indicated that the vehicle traveled at an approximately equal speed from the start to the end of the period.

In FIG. 8, (b) is a graph indicating the acceleration data for the ten second period. In FIG. 8, (b) indicates that the acceleration was almost zero from the start to the end of the period.

In FIG. 8, (c) indicates an example of the monitoring recommended level output by inputting the speed data and the acceleration data indicated in (a) and (b) of FIG. 8 to trained model 156 as the input data. The monitoring recommended level indicated in (c) of FIG. 8 is kept zero from the start to the end of the period. This is because trained model 156 was constructed based on that the monitoring information indicating that the monitoring agent did not monitor the vehicle when the vehicle traveled at an equal speed from the start to the end of the period was included in training data 153.

Next, two examples of the presentation information displayed by display device 30 will be described.

Figure 9:
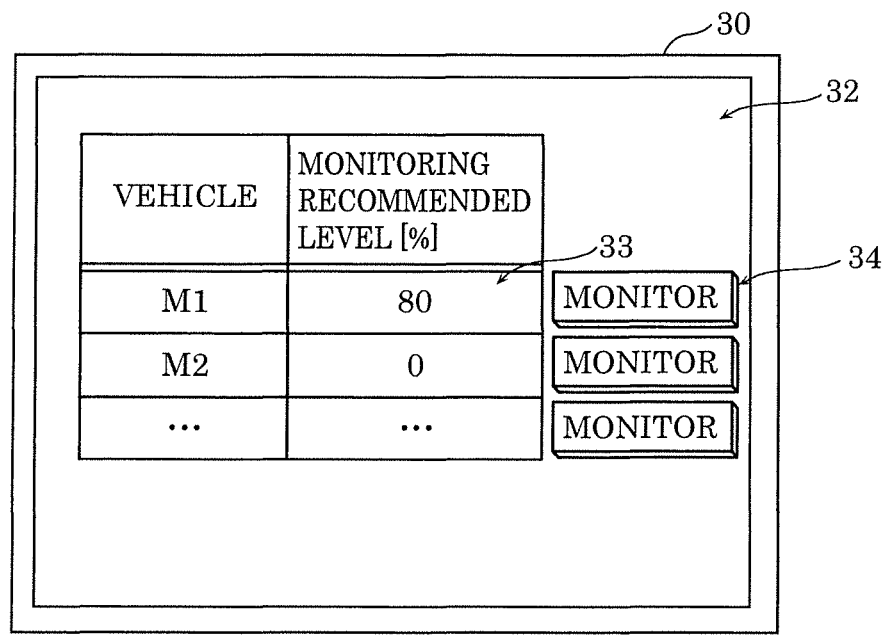
FIG. 9 illustrates a first example of presentation information according to the embodiment.

FIG. 9 illustrates a first example of the presentation information according to the present embodiment. FIG. 9 illustrates an example in which the monitoring recommended levels are presented as the presentation information.

As illustrated in FIG. 9, image 32 displayed by display device 30 includes image 33 which indicates the monitoring recommended level associated with each of vehicles M1 etc. The monitoring recommended level in image 33 corresponds to the monitoring recommended level in FIG. 7 or FIG. 8 represented by percent. For example, it is indicated that the monitoring recommended level of vehicle M1 is 80%, and the monitoring recommended level of vehicle M2 is 0%.

Moreover, image 32 includes image 34 of buttons for starting monitoring of respective vehicles M1 etc.

The monitoring agent views image 32, selects a vehicle targeted for monitoring, and operates image 34 of the button corresponding to the selected vehicle. The operation is received by input device 20, and the operation information indicating the operation is received by receiver 16.

Figure 10:
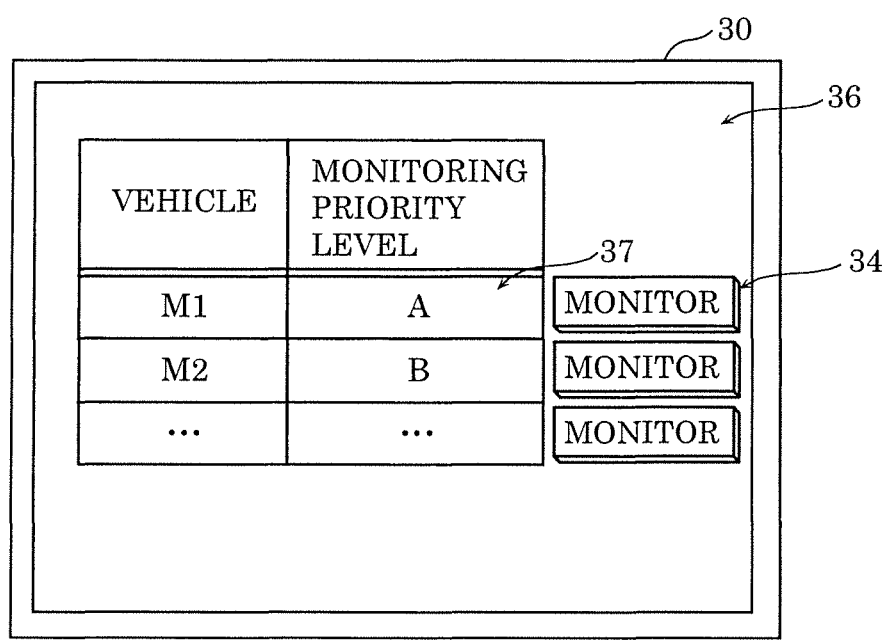
FIG. 10 illustrates a second example of the presentation information according to the embodiment.

FIG. 10 illustrates a second example of the presentation information according to the present embodiment. FIG. 10 illustrates an example in which the monitoring priority levels are presented as the presentation information.

As illustrated in FIG. 10, image 36 displayed by display device 30 includes image 37 indicating the monitoring priority level of each of vehicles M1 etc. The monitoring priority level is information calculated based on the monitoring recommended level illustrated in FIG. 7 or FIG. 8, and indicates the level which requires preferentially monitoring the vehicle. The monitoring priority level is, for example, represented by three levels including A (high), B (medium), and C (low). For example, it is indicated that the monitoring priority level of vehicle M1 is A and the monitoring priority level of vehicle M2 is B.

Image 36 also includes image 34 of buttons in a similar manner to FIG. 9.

The monitoring agent views image 36, selects a vehicle targeted for monitoring, and operates image 34 of the button corresponding to the selected vehicle. The operation is received by input device 20, and the operation information indicating the operation is received by receiver 16.

In the case where there is no vehicle having a monitoring priority level higher than a threshold value, presentation information indicating that no monitoring is necessary may be presented. For example, information indicating that no monitoring target exists, information prompting to take a break from the monitoring work, or information prompting to perform work different from the monitoring work may be presented.

Moreover, the time period during which no vehicle having a monitoring priority level higher than the threshold value exists, that is, the time period during which no monitoring is necessary may be recorded so that the statistical information of the time period during which no monitoring is necessary may be presented. For example, statistical information, such as an average value, a middle value, or a mode value of the time period during which no monitoring is necessary, or distribution in a specific period, such as day, week, or month, of the time period during which no monitoring is necessary may be presented.

Moreover, based on the statistical information of the time period during which no monitoring is necessary, a suggestion for the period during which the monitoring agent may be away from the monitoring work, such as a break, may be presented. For example, information prompting the taking of a break in the time of day when the time period during which no monitoring is necessary is statistically long may be presented.

Processing performed by monitoring system 1 configured as above will be described below.

Figure 11:
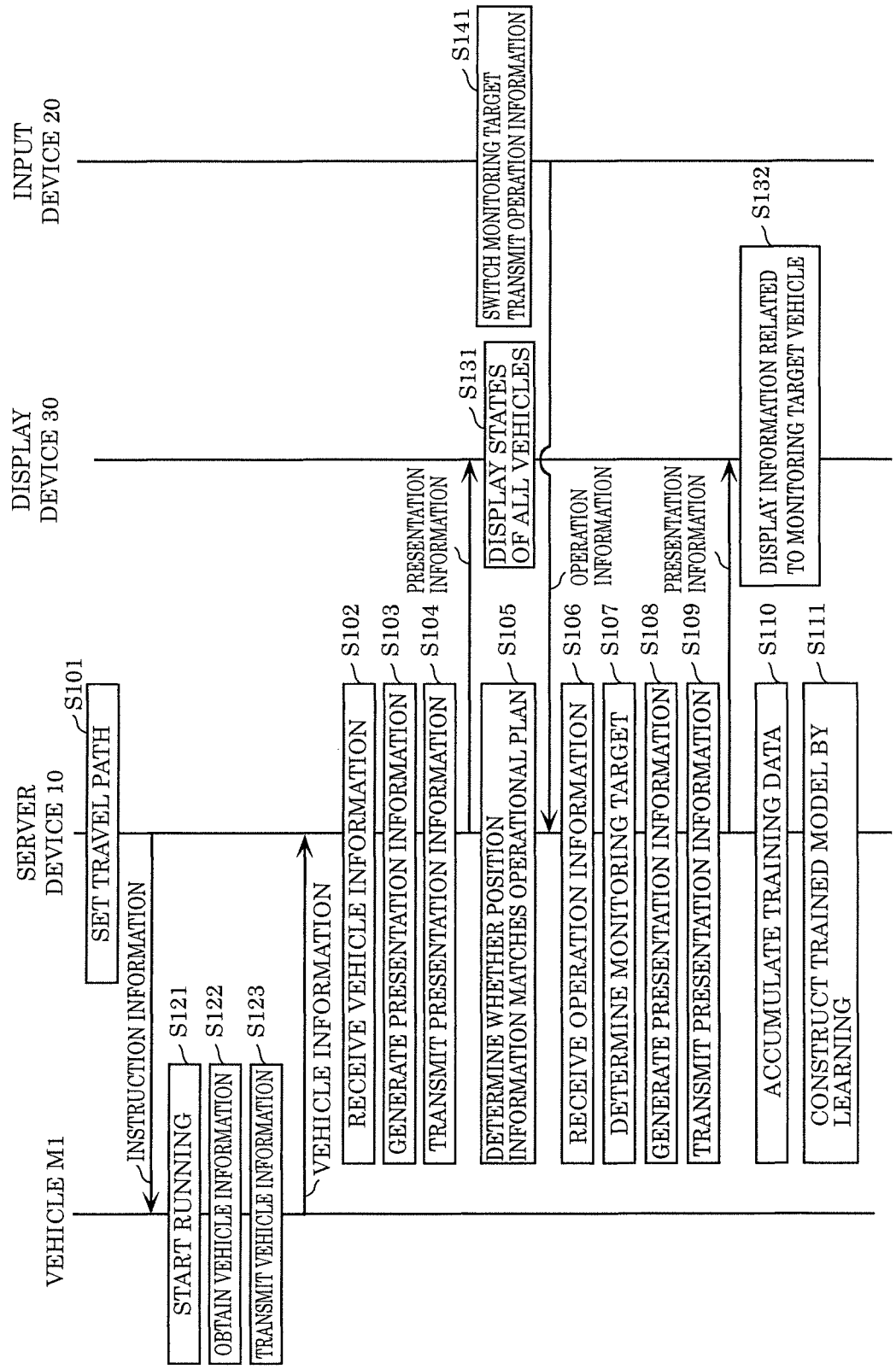
FIG. 11 is a first sequence diagram of processing performed by the monitoring system according to the embodiment.

FIG. 11 is a first sequence diagram of processing performed by monitoring system 1 according to the present embodiment. The sequence diagram illustrated in FIG. 11 illustrates the flow of processing performed when server device 10 constructs trained model 156 for determining the monitoring target and the like based on the determination of the monitoring agent. Although FIG. 11 illustrates vehicle M1 as a representative of vehicles M1 etc., similar processing is also performed on other vehicles M2 to MN.

As illustrated in FIG. 11, in step S101, operational manager 14 of server device 10 sets the travel path of vehicle M1 based on the operational plan of vehicle M1 stored in operational DB 13. Operational manager 14 then transmits instruction information including the set travel path to vehicle M1. Operational manager 14 also sets the travel paths of other vehicles M2 to MN in a similar manner, and transmits instruction information to the other vehicles M2 to MN.

In step S121, vehicle M1 receives the instruction information transmitted by operational manager 14 in step S101. Vehicle M1 then travels along the travel path set by operational manager 14 based on the received instruction information.

In step S122, vehicle M1 obtains vehicle information (that is, sensing data and image data).

In step S123, vehicle M1 transmits the vehicle information obtained in step S122 to server device 10. After step S123, too, vehicle M1 obtains the vehicle information and transmits the obtained vehicle information to server device 10.

The processing in steps S121 to S123 is also performed on other vehicles M2 to MN in a similar manner.

In step S102, communication unit 11 of server device 10 receives the vehicle information transmitted by vehicles M1 etc. in step S123. Communication unit 11 provides the received vehicle information to vehicle state manager 12.

In step S103, video manager 18 generates presentation information including the vehicle information of each of vehicles M1 etc. received in step S102.

In step S104, video manager 18 transmits the presentation information of each of vehicles M1 etc. generated in step S103 to display device 30.

In step S131, display device 30 displays the presentation information of each of vehicles M1 etc. that is, the presentation information of all vehicles, transmitted by video manager 18 in step S104. The displayed presentation information is viewed by the monitoring agent.

In step S141, input device 20 receives an operation performed by the monitoring agent for switching the monitoring target. The operation can be an operation based on the determination made by the monitoring agent after viewing the presentation information displayed by display device 30 in step S131 and considering which vehicle is to be monitored. Input device 20 then transmits the operation information indicating the details of the received operation to server device 10. The operation information includes information indicating to which vehicle the monitoring agent switched as the monitoring target among vehicles M1 etc. In the case where no operation was performed by the monitoring agent, operation information indicating that no operation was performed may be transmitted to server 10 or no operation information may be transmitted.

In step S105, operational manager 14 of server device 10 determines whether or not the position information included in the vehicle information received in step S102 matches the operational plan, and generates operational information indicating the result of the determination.

In step S106, receiver 16 of server device 10 receives the operation information transmitted by input device 20 in step S141.

In step S107, monitoring controller 17 determines the monitoring target based on the operation information received in step S106, and generates monitoring information indicating the monitoring target.

In step S108, video manager 18 generates presentation information including information related to the monitoring target vehicle, based on the monitoring information generated by monitoring controller 17 in step S107.

In step S109, video manager 18 transmits the presentation information generated in step S108 to display device 30.

In step S132, display device 30 receives the presentation information transmitted in step S109, and displays the vehicle information of the monitoring target vehicle.

In step S110, recommendation unit 15 obtains and accumulates training data 153. Specifically, recommendation unit 15 obtains the vehicle information from vehicle state manager 12, obtains the operational information from operational manager 14, and obtains the monitoring information from monitoring controller 17. Recommendation unit 15 applies the processing by processor 151 on various kinds of information obtained. Recommendation unit 15 then stores the obtained various types of information and the data obtained by applying the processing of processor 151 on the various types of information in data storage 152 as training data 153.

In step S111, recommendation unit 15 constructs trained model 156. Specifically, recommendation unit 15 reads out training data 153 from machine learning unit 154, and constructs trained model 156 by machine learning. Trained model 156 constructed is provided to generator 155 for storage.

Figure 12:
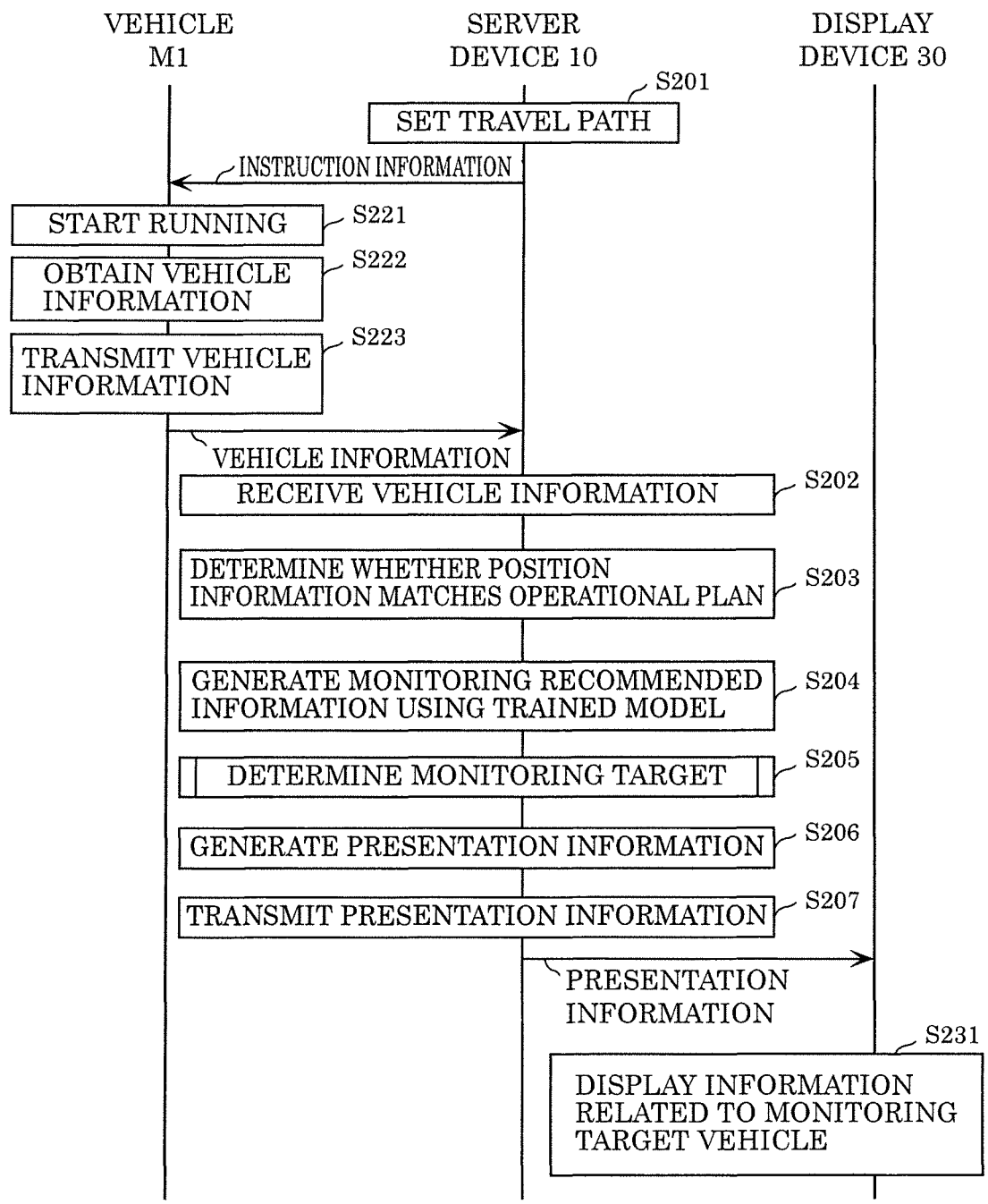
FIG. 12 is a second sequence diagram of processing performed by the monitoring system according to the embodiment.

FIG. 12 is a second sequence diagram of processing performed by monitoring system 1 according to the present embodiment. The sequence diagram illustrated in FIG. 12 illustrates the flow of processing for determining the recommended monitoring target by using constructed trained model 156. Although FIG. 12 illustrates vehicle M1 as a representative of vehicles M1 etc., similar processing is performed on other vehicles M2 to MN.

As illustrated in FIG. 12, in step S201, operational manager 14 of server device 10 sets the travel path of vehicle M1, and transmits instruction information including the set travel path to vehicle M1. The processing in step S201 is the same as the processing in step S101 in FIG. 11.

In steps S221 to S223, vehicle M1 travels based on the instruction information transmitted by operational manager 14 in step S201, and transmits the vehicle information to server device 10. The processing in steps S221 to S223 is the same as the processing in steps S121 to S123 in FIG. 11.

In step S202, communication unit 11 of server device 10 receives the vehicle information transmitted by vehicles M1 etc. in step S223. Communication unit 11 provides the received vehicle information to vehicle state manager 12.

In step S203, operational manager 14 of server device 10 determines whether or not the position information included in the vehicle information received in step S202 matches the operational plan, and generates operational information indicating the result of the determination.

In step S204, generator 155 of recommendation unit 15 obtains recommended monitoring information by using trained model 156. Specifically, generator 155 obtains the vehicle information received by communication unit 11 in step S202 from vehicle state manager 12, and obtains the operational information generated by operational manager 14 in step S203. Generator 155 then obtains recommended information output as a result of inputting the obtained vehicle information and operational information as input data to trained model 156, and provides the obtained recommended information to monitoring controller 17.

In step S205, monitoring controller 17 determines a monitoring target to be monitored by the monitoring agent, and generates monitoring information which can identify the monitoring target. When determining the monitoring target, monitoring controller 17 determines the monitoring target based on the recommended information provided by recommendation unit 15 in step S204 and the operation information received by receiver 16. Monitoring controller 17 provides the generated monitoring information to video manager 18.

In step S206, video manager 18 generates presentation information to be presented to the monitoring agent, based on the monitoring information provided by monitoring controller 17 in step S205.

In step S207, video manager 18 transmits the presentation information generated in step S206 to display device 30.

In step S231, display device 30 receives the presentation information transmitted by monitoring controller 17 in step S207, and displays information related to the monitoring target vehicle based on the present information.

Figure 13:
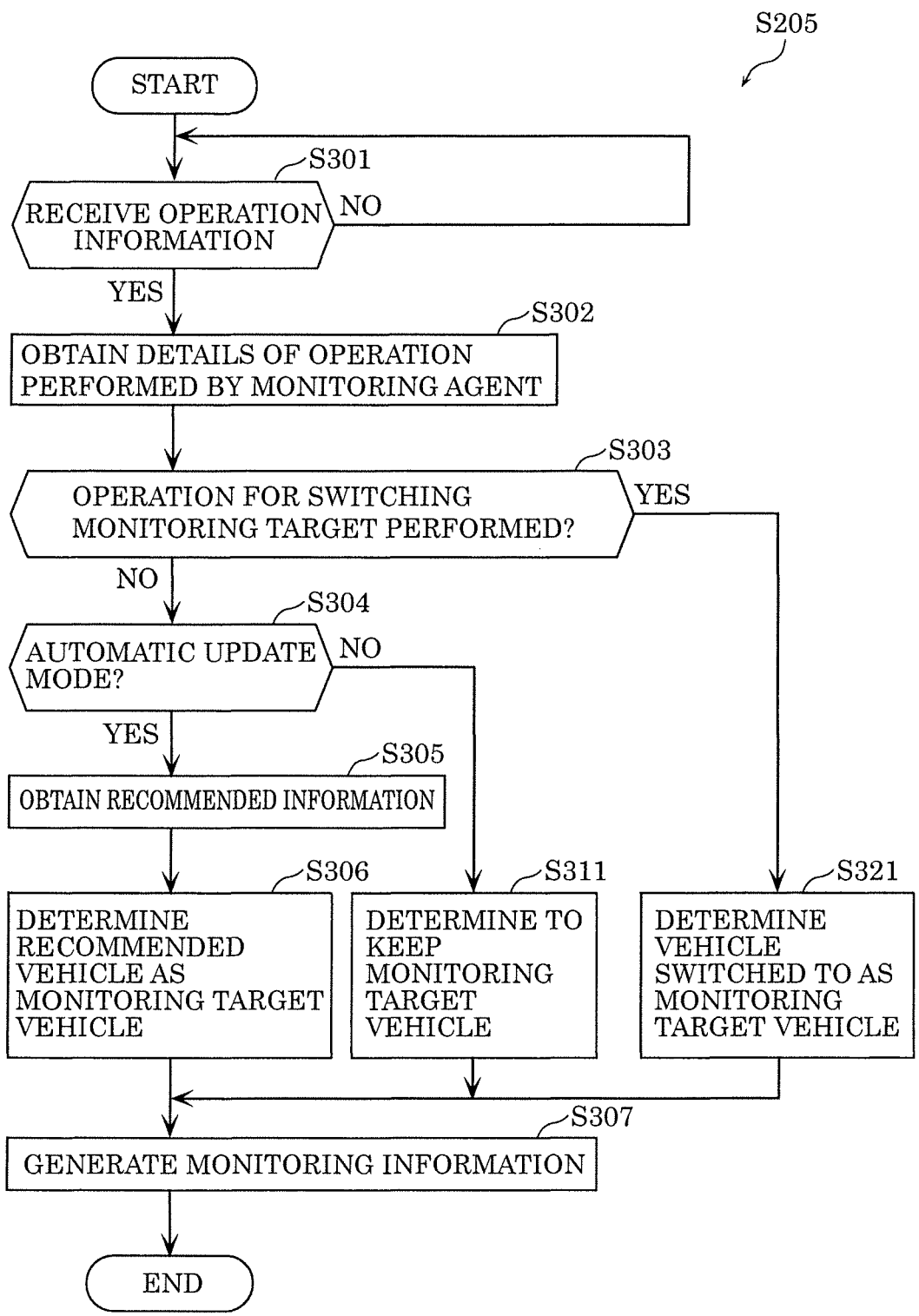
FIG. 13 illustrate a flow of processing performed by a monitoring controller according to the embodiment.

FIG. 13 is a flow diagram of the processing performed by monitoring controller 17 according to the present embodiment. The processing illustrated in FIG. 13 is the detailed processing performed in step S205 illustrated in FIG. 12.

In step S301, monitoring controller 17 determines whether or not receiver 16 has received the operating information from input device 20. When monitoring controller 17 determines that receiver 16 has received the operation information (Yes in step S301), the proceeding proceeds to step S302, and when not (No in step S301), the processing in step S301 is performed again. In other words, monitoring controller 17 is in a standby state in step S301 till the operation information is received.

In step S302, monitoring controller 17 obtains the details of the operation performed by the monitoring agent based on the operation information received by receiver 16.

In step S303, monitoring controller 17 determines whether or not an operation for switching the monitoring target has been performed. When monitoring controller 17 determines that the operation has been performed (Yes in step S303), the processing proceeds to step S321, and when monitoring controller 17 determines that no operation has been performed (No in step S303), the processing proceeds to step S304.

In step S304, monitoring controller 17 determines whether or not the current operating mode is an automatic update mode. When the current operating mode is the automatic update mode (Yes in step S304), the processing proceeds to step S305, and when not (No in step S304), the processing proceeds to step S311.

In step S305, monitoring controller 17 obtains the recommended information provided by generator 155 of recommendation unit 15 in step S204.

In step S306, monitoring controller 17 determines the vehicle recommended by the recommended information as the monitoring target vehicle.

In step S311, monitoring controller 17 determines to maintain the current monitoring target vehicle.

In step S321, monitoring controller 17 determines which vehicle is switched to by the switching operation performed by the monitoring agent as the monitoring target vehicle.

In step S307, monitoring controller 17 generates monitoring information indicating the monitoring target based on the determination made in step S306, S311, or S321. When the processing in step S307 ends, a series of processing illustrated in FIG. 13 ends. The monitoring information generated in step S307 is provided to video manager 18 to be used in the processing in step S206.

Machine learning unit 154 may update trained model 156 by using the operation information received in step S301. In other words, machine learning unit 154 considers that the operation information received in step S301 was received in step S106 (see FIG. 11), and performs the processing in steps S107 to S111. In this way, machine learning unit 154 is capable of constructing trained model 156, so that trained model 156 is updated.

The case where recommendation unit 15 recommends the monitoring target vehicle has been described above, but recommendation unit 15 may further make recommendation including how to monitor the vehicle. How to monitor the vehicle includes, for example, monitoring approximately how fast the vehicle is traveling, and which direction should be monitored as seen from the vehicle. In this case, the recommended information includes not only information for identifying the vehicle, but also information identifying how to monitor the vehicle. When the monitoring information further includes information identifying the method of monitoring the vehicle, data corresponding to the monitoring method among the image data and the sensing data received by communication unit 11 from the vehicle is included in the presentation information, and is presented to the monitoring agent. More specifically, as the method of monitoring the vehicle, when which direction should be monitored as seen from the vehicle is recommended, the image captured by the camera in the monitoring target direction among one or more cameras included in the vehicle is included in the presentation information.

When the first monitoring result includes information related to the first monitoring agent and trained model 156 has been obtained by machine learning in which the information related to the first monitoring agent is used, the recommended content may be determined by further inputting the information related to the second monitoring agent to trained model 156.

When the information related to the first monitoring agent includes at least one of the identification information, work history information, or attribute information of the first monitoring agent, the information related to the second monitoring agent may include at least one of the identification information, work history information, or attribute information of the second monitoring agent.

When the information related to the first monitoring agent includes terminal information related to the terminal used by the first monitoring agent for monitoring, the information related to the second monitoring agent may include terminal information related to the terminal to be used by the second monitoring agent for monitoring.

Variation of Embodiment

In the present variation, a configuration will be described which is different from the embodiment described above and is related to, for example, the information processing method capable of reducing the burden of monitoring imposed on the monitoring agent.

Figure 14:
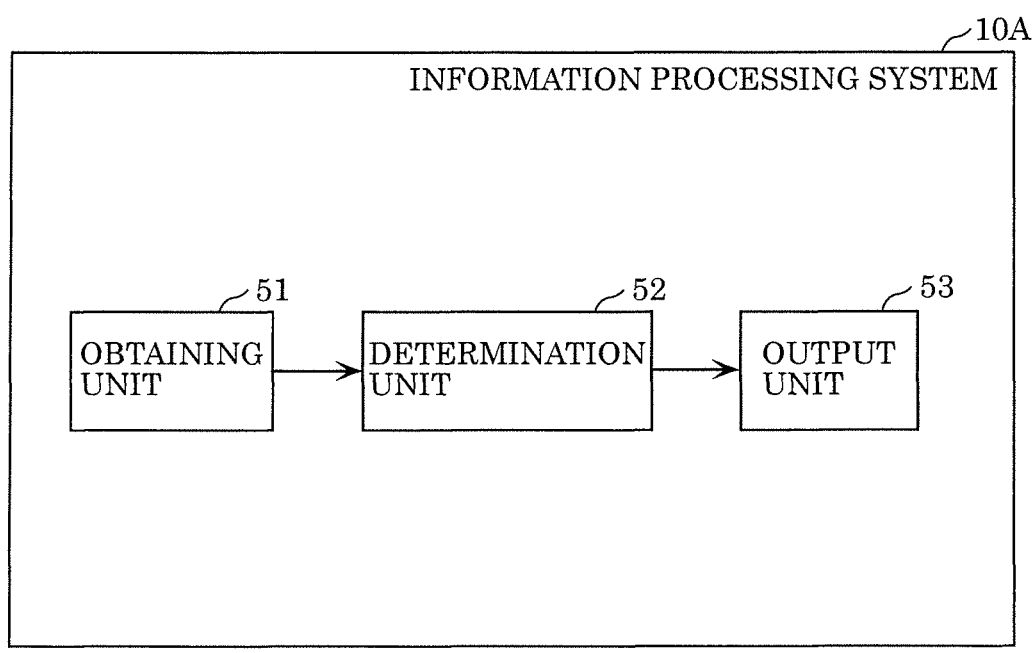
FIG. 14 is a block diagram of a configuration of an information processing system according to a variation of the embodiment.

FIG. 14 is a block diagram of a configuration of information processing system 10A according to the present variation. The configuration below included in information processing system 10A according to the present variation can be implemented by using a computer, more specifically, by a processor executing a predetermined program using a memory.

As illustrated in FIG. 14, information processing system 10A includes obtaining unit 51, determination unit 52, and output unit 53.

Obtaining unit 51 obtains second situational information related to the situation of at least one of a vehicle or surroundings of the vehicle at a second time point subsequent to the first time point. Obtaining unit 51 corresponds to the function of generator 155 for obtaining the situational information.

Determination unit 52 determines the recommended content related to vehicle monitoring recommended to the second monitoring agent by inputting the second situational information to the trained model obtained by machine learning in which the first situational information, related to the situation of at least one of the vehicle or surroundings of the vehicle, and the first monitoring result, which is a result of the monitoring by the first monitoring agent based on the first situational information, are used. Determination unit 52 corresponds to the function of generator 155 for determining the recommended information.

Output unit 53 generates presentation information for monitoring the vehicle based on the determined recommended content, and causes the presentation device to output the presentation information. Output unit 53 corresponds to video manager 18.

Accordingly, information processing system 10A is capable of reducing the burden of monitoring imposed on the monitoring agent.

Figure 15:
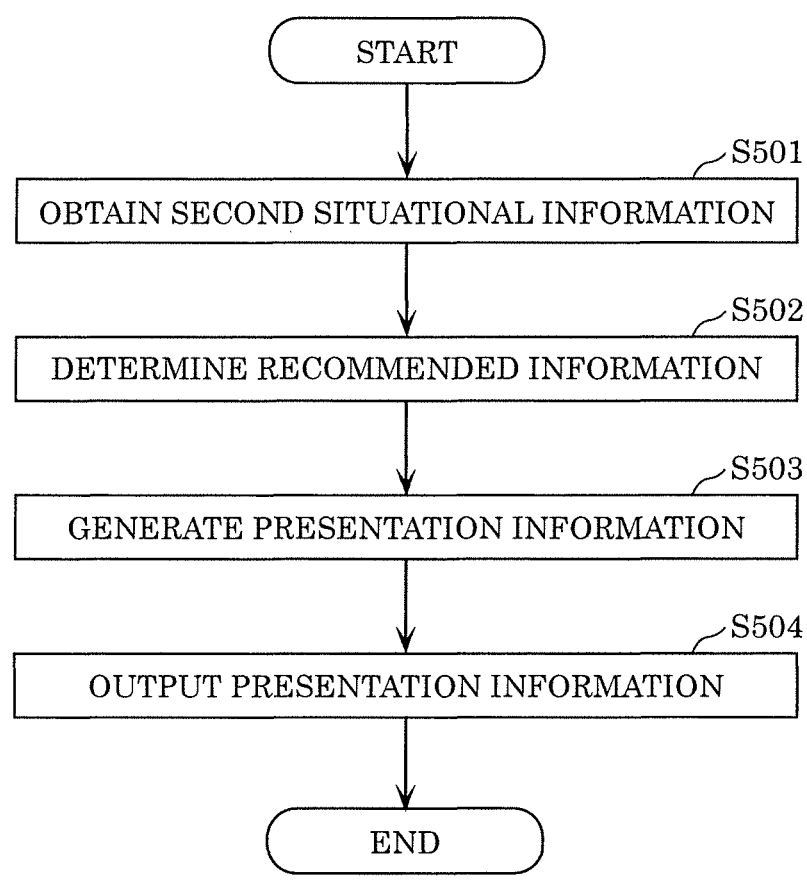
FIG. 15 illustrates a flow of an information processing method according to the variation of the embodiment.

FIG. 15 is a flow diagram of an information processing method according to the present variation. The following processing included in the information processing method according to the present variation can be implemented by a computer.

As illustrated in FIG. 15, in step S501, second situational information is obtained which is related to the situation of at least one of a vehicle or surroundings of the vehicle at the second time point subsequent to the first time point.

In step S502, recommended content related to vehicle monitoring recommended to the second monitoring agent is determined by inputting the second situational information to the trained model obtained by machine learning in which the first situational information, related to the situation of at least one of the vehicle or surroundings of the vehicle at the first time point, and the first monitoring result, which is the result of the monitoring by the first monitoring agent based on the first situational information, are used.

In step S503, presentation information for monitoring the vehicle is generated based on the determined recommended content.

In step S504, the presentation device outputs the presentation information.

Accordingly, the burden of monitoring imposed on the monitoring agent can be reduced.

As described above, in the information processing method according to the above embodiment and its variation, by using the trained model constructed by machine learning in which the result of the determination made by the monitoring agent related to the monitoring in the situation at the first time point is used, information related to the monitoring recommended in the situation at the second time point is output. In other words, the monitoring determination made by the monitoring agent in the past is reflected in the subsequently output information related to the recommended monitoring. Accordingly, the monitoring agent is not required to always monitor the vehicle, and is capable of making determination on the monitoring work by referring to the recommended monitoring information. Hence, the burden of monitoring imposed on the monitoring agent can be reduced. Moreover, reduced burden of monitoring allows the vehicles under control to be monitored such that the number of monitoring agents is less than the number of vehicles under control.

Moreover, the trained model is a neural network model, and thus, the trained model can be easily generated even when the relationship between the situational information and the monitoring result is complicated.

Moreover, the trained model is constructed based on the information indicating the vehicle targeted for monitoring at the first time point. Accordingly, the accuracy (in other words, appropriateness) of the recommended content output by the trained model about the vehicle characteristics can be increased by learning the characteristics of the vehicle selected as the monitoring target. Hence, the effect of reducing the burden of monitoring imposed on the monitoring agent can be increased.

Moreover, the trained model is constructed based on the information identifying the operation performed by the monitoring agent on the vehicle targeted for monitoring at the first time point. Accordingly, the accuracy of the recommended content output by the trained model about the operation performed can be increased by learning the operation performed on the vehicle selected as the vehicle targeted for monitoring. Hence, the effect of reducing the burden of monitoring imposed on the monitoring agent can be increased.

Moreover, the trained model is constructed based on the information identifying the time period and the time related to the monitoring at the first time point. Accordingly, the accuracy of the recommended content output by the trained model about the time period used for the monitoring can be increased by learning the time period used for monitoring the vehicle selected as the vehicle targeted for monitoring. Hence, the effect of reducing the burden of monitoring imposed on the monitoring agent can be increased.

Moreover, the trained model is constructed based on the information identifying the time period during which a vehicle is continuously untargeted for monitoring after the vehicle was targeted for monitoring at the first time point. Accordingly, by learning the non-monitored vehicle and the non-monitored time period, the accuracy of the recommended content output by the trained model about the non-monitored vehicle and the non-monitored time period can be increased. Hence, the effect of reducing the burden of monitoring imposed on the monitoring agent can be increased.

Moreover, the trained model is constructed based on information indicating the time period from when the situation at the first time point is presented till when the monitoring agent identifies the vehicle to be monitored, that is, till the start of the monitoring. Hence, the accuracy of the recommended content output by the trained model about the time period taken till the start of the monitoring can be increased.

Moreover, the trained model is constructed not only based on the monitoring result, but also the information related to the monitoring agent at the first time point. Accordingly, the accuracy of the recommended content can be further increased.

Moreover, the leering model is constructed based on the experience or the characteristics of the first monitoring agent. Accordingly, the recommended content corresponding to the experience or characteristics of the second monitoring agent can be determined. Hence, the accuracy of the recommended content can be further increased.

Moreover, the leering model is constructed based on the state or the characteristics of the terminal operated by the first monitoring agent. Accordingly, the recommended content corresponding to the state or characteristics of the terminal to be operated by the second monitoring agent can be determined. Hence, the accuracy of the recommended content can be further increased.

Moreover, the trained model is updated by using the monitoring result at the second time point. Accordingly, the trained model can be continuously improved, leading to a sustainable monitoring system.

Moreover, the trained model is updated by preferentially using the monitoring result of the monitoring agent identified based on the work history of the monitoring agent at the first time point. Accordingly, by updating the trained model using the monitoring result of the monitoring agent which serves as a model, the trained model can be efficiently updated.

Moreover, as the information related to the vehicle monitoring recommended at the second time point, the vehicle recommended for the monitoring target is presented on the presentation device. Accordingly, the monitoring agent is capable of directly perceiving the vehicle recommended for the monitoring target at the second time point.

Moreover, as the information related to the vehicle monitoring recommended at the second time point, one or more vehicles and the monitoring recommended levels of the vehicles are presented on the presentation device. Accordingly, the monitoring agent is capable of easily perceiving the vehicle to be monitored at the second time point among the presented one or more vehicles.

Moreover, as the information related to the vehicle monitoring recommended at the second time point, information indicating the monitoring direction is presented on the presentation device. Accordingly, the monitoring agent is capable of easily perceiving the direction to be monitored at the second time point.

Moreover, as the information related to the vehicle monitoring recommended at the second time point, information indicating points to be monitored is presented on the presentation device. Accordingly, the monitoring agent is capable of perceiving the points to be monitored without making determination based on the situation at the second time point. Alternatively, determination on the points to be monitored can be assisted.

Each of the structural elements in the above-described embodiment may be configured in the form of an exclusive hardware product, or may be realized by executing a software program suitable for the structural component. Each of the structural elements may be realized by means of a program executing unit, such as a CPU and a processor, reading and executing the software program recorded on a recording medium such as a hard disk or a semiconductor memory. Here, the software program for realizing the information processing method according to the above-described embodiment is the program described below.

In other words, the program causes a computer to execute: obtaining second situational information related to a situation of at least one of a vehicle or surroundings of the vehicle at a second time point subsequent to a first time point; determining recommended content by inputting the second situational information to a trained model obtained by machine learning in which first situational information and a first monitoring result are used, the recommended content being related to vehicle monitoring recommended to a second monitoring agent, the first situational information being related to a situation of at least one of the vehicle or the surroundings of the vehicle at the first time point, the first monitoring result being a result of monitoring by a first monitoring agent based on the first situational information; generating presentation information for the vehicle monitoring based on the recommended content determined; and causing a presentation device to output the presentation information.

The information processing method and the like according to one or more aspects has been described above based on the embodiment, but the present disclosure is not limited to such an embodiment. Various modifications of the embodiment as well as embodiments resulting from combinations of structural elements of different exemplary embodiments that may be conceived by those skilled in the art may be included within the scope of one or more aspects as long as these do not depart from the essence of the present disclosure.

INDUSTRIAL APPLICABILITY

The present disclosure is applicable to an information processing method capable of reducing the burden of monitoring imposed on a monitoring agent.

What is claimed is:

1. An information processing method, comprising the following performed using a computer:
obtaining second situational information related to a situation of at least one of a vehicle or surroundings of the vehicle at a second time point subsequent to a first time point;
determining recommended content by inputting the second situational information to a trained model obtained by machine learning in which first situational information and a first monitoring result are used, and externally monitoring a vehicle by a first monitoring agent and a second monitoring agent, the recommended content being related to vehicle monitoring recommended to the second monitoring agent among a plurality of vehicle monitorings, the first situational information being related to a situation of at least one of the vehicle or the surroundings of the vehicle at the first time point, the first monitoring result being a result of monitoring by the first monitoring agent based on the first situational information;
generating presentation information for the vehicle monitoring based on the recommended content determined; and causing a presentation device to output the presentation information,
wherein the first monitoring result includes information identifying a time period during which a vehicle is continuously untargeted for monitoring after the vehicle was targeted for monitoring by the first monitoring agent.

2. The information processing method according to claim 1,
wherein the trained model is a neural network model obtained by machine learning in which the first situational information is used as input data and the first monitoring result is used as reference data.

3. The information processing method according to claim 1,
wherein the first monitoring result includes information indicating a vehicle targeted for monitoring by the first monitoring agent.

4. The information processing method according to claim 1,
wherein the first monitoring result includes information identifying an operation performed by the first monitoring agent on a vehicle targeted for monitoring by the first monitoring agent.

5. The information processing method according to claim 1,
wherein the first monitoring result includes information identifying at least one of a time period or a time related to monitoring by the first monitoring agent.

6. The information processing method according to claim 1,
wherein the first monitoring result includes information identifying a time period taken from when the first situational information is presented till when the first monitoring agent identifies a vehicle to be monitored.

7. The information processing method according to claim 1,
wherein the first monitoring result further includes information related to the first monitoring agent,
the trained model is obtained by machine learning in which the information related to the first monitoring agent is further used, and
the recommended content is determined by further inputting information related to the second monitoring agent to the trained model.

8. The information processing method according to claim 7,
wherein the information related to the first monitoring agent includes at least one of identification information, work history information, or attribute information of the first monitoring agent, and
the information related to the second monitoring agent includes at least one of identification information, work history information, or attribute information of the second monitoring agent.

9. The information processing method according to claim 7,
wherein the information related to the first monitoring agent includes terminal information related to a terminal used by the first monitoring agent for monitoring, and
the information related to the second monitoring agent includes terminal information related to a terminal to be used by the second monitoring agent for monitoring.

10. The information processing method according to claim 1, further comprising:
obtaining a second monitoring result which is a result of monitoring by the second monitoring agent; and
updating the trained model by machine learning in which the second situational information is used as input data and the second monitoring result is used as reference data.

11. The information processing method according to claim 10,
wherein in the updating, the trained model is updated by preferentially using the second situational information and the second monitoring result corresponding to the second monitoring agent identified by work history information of the first monitoring agent.

12. The information processing method according to claim 1,
wherein the recommended content includes a recommended monitoring target vehicle, and
the presentation information includes information indicating the recommended monitoring target vehicle included in the recommended content.

13. The information processing method according to claim 1,
wherein the recommended content includes one or more vehicles which are potential monitoring targets and a monitoring recommended level of each of the one or more vehicles, and
the presentation information includes information indicating the monitoring recommended level of each of the one or more vehicles included in the recommended content.

14. The information processing method according to claim 1,
wherein the recommended content includes a monitoring direction as seen from the recommended monitoring target vehicle, and
the presentation information includes an image captured from the recommended monitoring target vehicle in the monitoring direction included in the recommended content.

15. The information processing method according to claim 1,
wherein the recommended content includes a point to be monitored recommended to the second monitoring agent, and
the presentation information includes information indicating the point to be monitored included in the recommended content.

16. An information processing system, comprising:
a memory configured to store a program; and
a processor configured to execute the program and control the information processing system to:
obtain second situational information related to a situation of at least one of a vehicle or surroundings of the vehicle at a second time point subsequent to a first time point;
determine recommended content by inputting the second situational information to a trained model obtained by machine learning in which first situational information and a first monitoring result are used, the recommended content being related to vehicle monitoring recommended to a second monitoring agent among a plurality of vehicle monitorings, the first situational information being related to a situation of at least one of the vehicle or the surroundings of the vehicle at the first time point, the first monitoring result being a result of monitoring by a first monitoring agent based on the first situational information; and generate presentation information for the vehicle monitoring based on the recommended content determined, and cause a presentation device to output the presentation information,
wherein the first monitoring agent and the second monitoring agent externally monitor a vehicle, and
wherein the first monitoring result includes information identifying a time period during which a vehicle is continuously untargeted for monitoring after the vehicle was targeted for monitoring by the first monitoring agent.

* * * * *